(12) United States Patent
Ucar et al.

(10) Patent No.: US 12,709,304 B2
(45) Date of Patent: Aug. 18, 2026

(54) COMPENSATE FOR PERFORMANCE DEGRADATION THROUGH VEHICULAR KNOWLEDGE NETWORKING

(71) Applicant: TOYOTA MOTOR ENGINEERING & MANUFACTURING NORTH AMERICA, INC., Plano, TX (US)

(72) Inventors: Seyhan Ucar, Mountain View, CA (US); Onur Altintas, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 79 days.

(21) Appl. No.: 18/436,781

(22) Filed: Feb. 8, 2024

(65) Prior Publication Data

US 2025/0256741 A1 Aug. 14, 2025

(51) Int. Cl.
*B60W 60/00* (2020.01)

(52) U.S. Cl.
CPC ... *B60W 60/00272* (2020.02); *B60W 2554/40* (2020.02); *B60W 2556/45* (2020.02)

(58) Field of Classification Search
CPC ....... B60W 60/00272; B60W 2556/45; B60W 2554/40
See application file for complete search history.

(56) References Cited

U.S. PATENT DOCUMENTS

| | | | | |
|---|---|---|---|---|
| 9,495,874 | B1 * | 11/2016 | Zhu | G08G 1/096741 |
| 9,623,765 | B2 | 4/2017 | Liu | |
| 10,678,259 | B1 * | 6/2020 | Ferguson | G06T 7/001 |
| 11,282,378 | B2 | 3/2022 | Higuchi | |
| 2009/0114463 | A1 | 5/2009 | Devault | |
| 2010/0072954 | A1 | 3/2010 | Kohn | |
| 2011/0153140 | A1 | 6/2011 | Datta | |

(Continued)

OTHER PUBLICATIONS

Ucar et al., "Risk Avoidance by Vehicular Knowledge Networking," 2022 IEEE 95th Vehicular Technology Conference (VTC2022-Spring), Jun. 2022, 5 pages (https://doi.org/10.1109/VTC2022-Spring54318.2022.9861035).

(Continued)

*Primary Examiner* — Hussein Elchanti
(74) *Attorney, Agent, or Firm* — SHEPPARD, MULLIN, RICHTER & HAMPTON LLP; Daniel N. Yannuzzi

(57) ABSTRACT

Systems and methods are provided for compensating for performance degradation on an edge of the vehicular knowledge network. An example includes detecting a performance result of first guidance performed by a first vehicle in a first driving environment that differs from an expected result associated with the first guidance associated with a second driving environment that corresponds to the first driving environment, identifying behavior executed by the first vehicle associated with the detected performance result based on a comparison between the first driving environment to the second driving environment, and, based on detecting that a second vehicle is executing the identified behavior, generate second guidance to mitigate the identified behavior being executed by the second vehicle.

20 Claims, 8 Drawing Sheets

(56) References Cited

U.S. PATENT DOCUMENTS

2012/0083960 A1* 4/2012 Zhu .......................... B60R 1/23 701/23
2012/0109408 A1 5/2012 Siy
2012/0143410 A1 6/2012 Gallagher
2012/0179518 A1* 7/2012 Jaipaul ............... G06Q 30/0241 701/117
2013/0024075 A1* 1/2013 Zagorski .................. B60T 7/22 701/1
2013/0151058 A1* 6/2013 Zagorski ............. G05D 1/0289 701/1
2013/0166123 A1 6/2013 Donald, III
2013/0238181 A1* 9/2013 James ............... B60W 30/0956 701/23
2013/0246020 A1* 9/2013 Zeng ...................... G06F 30/20 703/2
2014/0032017 A1* 1/2014 Anderson ............. G08G 1/165 700/275
2014/0074329 A1 3/2014 Yang
2014/0379183 A1 12/2014 Long
2015/0051763 A1 2/2015 Enomoto
2015/0057916 A1 2/2015 Ishii
2015/0291036 A1 10/2015 Ryu
2019/0079659 A1 3/2019 Adenwala
2019/0132709 A1 5/2019 Graefe
2021/0067369 A1 3/2021 Wiesenberg
2023/0083625 A1* 3/2023 Ucar ..................... G08G 1/166 701/117
2023/0267782 A1 8/2023 Ucar

OTHER PUBLICATIONS

Mercer et al., "Introducing the Contrast Profile: A Novel Time Series Primitive that Allows Real World Classification," Data Mining and Knowledge Discovery (DMKD 2022), 36:877-915, Mar. 17, 2022 (https://doi.org/10.1007/s10618-022-00824-5).
Ucar et al., "Driver Support in Confusion Zones," 8th International Conference on Models and Technologies for Intelligent Transportation Systems (MT-ITS 2023), Jun. 2023, 6 pages (https://doi.org/10.1109/MT-ITS56129.2023.10241714).
Vatanparvar et al., "Extended Range Electric Vehicle With Driving Behavior Estimation in Energy Management," IEEE Transactions on Smart Grid, 10(3):2959-2968, May 2019 (https://doi.org/10.1109/TSG.2018.2815689).
Madrid et al., "Matrix Profile XX: Finding and Visualizing Time Series Motifs of All Lengths using the Matrix Profile," 2019 IEEE International Conference on Big Knowledge (ICBK), Nov. 2019, pp. 175-182 (https://doi.org/10.1109/ICBK.2019.00031).

* cited by examiner

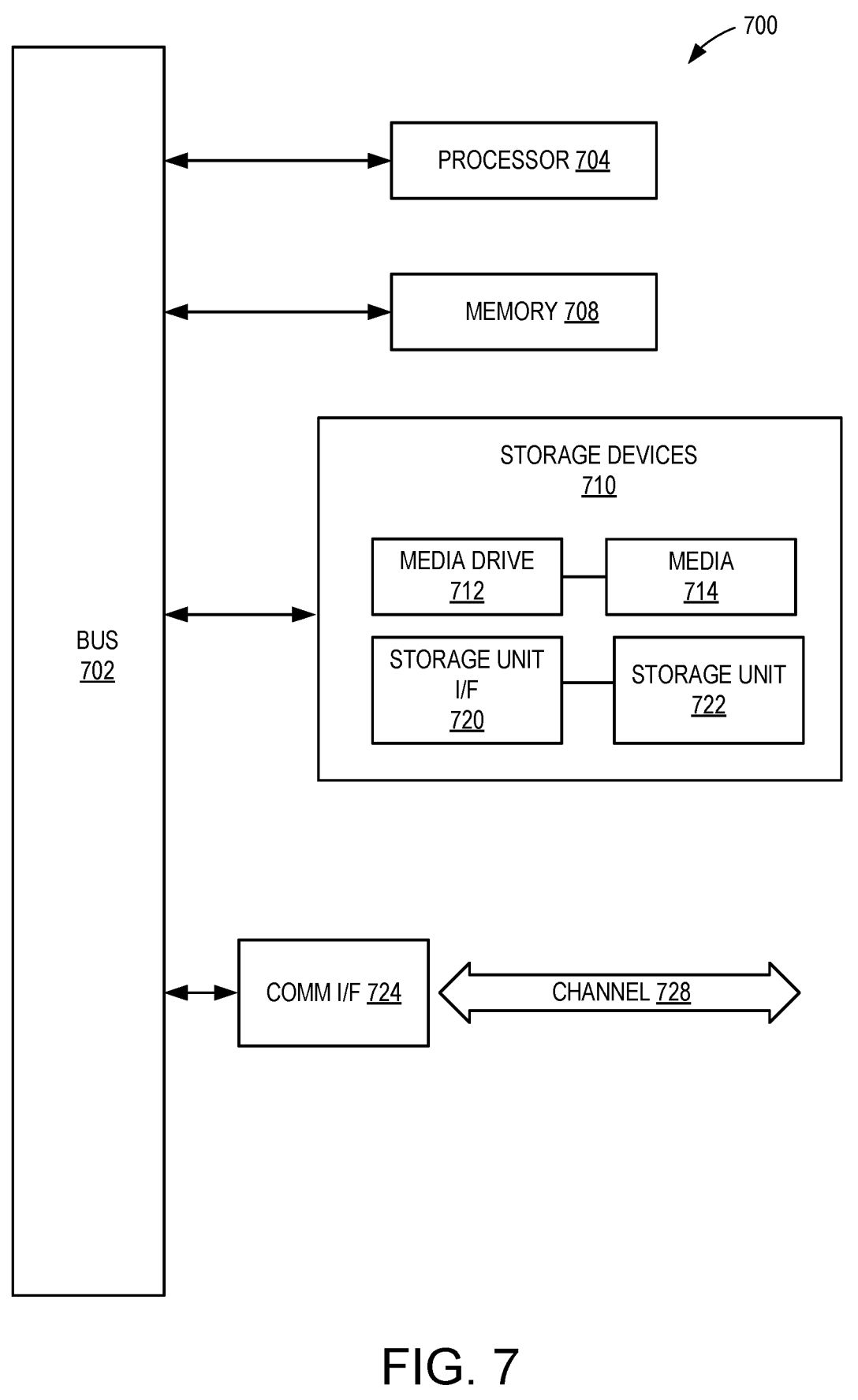

700

PROCESSOR 704

MEMORY 708

STORAGE DEVICES 710

MEDIA DRIVE 712

MEDIA 714

STORAGE UNIT I/F 720

STORAGE UNIT 722

BUS 702

COMM I/F 724

CHANNEL 728

FIG. 7

COMPENSATE FOR PERFORMANCE DEGRADATION THROUGH VEHICULAR KNOWLEDGE NETWORKING

REFERENCE TO RELATED APPLICATIONS

The present application is related to U.S. patent application Ser. No. 16/365,092, filed Mar. 26, 2019, and titled "VEHICULAR KNOWLEDGE DISTRIBUTION SYSTEM;" U.S. patent application Ser. No. 16/735,612, filed Jan. 6, 2020, and titled "VEHICULAR MICRO CLOUD HUBS;" U.S. patent application Ser. No. 18/173,524, filed Feb. 23, 2023, and titled "SYSTEMS AND METHODS TO IMPROVE KNOWLEDGE CYCLES IN VEHICULAR KNOWLEDGE NETWORKING;" U.S. patent application Ser. No. 18/300,367, filed Apr. 13, 2023, and titled "SYSTEMS AND METHODS FOR CONTEXT BASED KNOWLEDGE FORWARDING IN VEHICULAR KNOWLEDGE NETWORKING," which are incorporated herein by reference in entirety.

TECHNICAL FIELD

The present disclosure relates generally to systems and methods for vehicular knowledge networking, and, more particularly, some embodiments relate to compensation for performance degradation through vehicular knowledge networking.

DESCRIPTION OF RELATED ART

Technological advancements in the realm of communication networking have led to an emergence of "vehicular networking" (or connected vehicles), where direct connections between vehicles and other points (e.g., infrastructure, network, cloud, etc.) are enabled. With the various types of vehicle communication capabilities that have become available, vehicular networking may be further leveraged to support the concept of sharing "knowledge" in a manner that improves the operation of vehicles.

Occasionally, driving scenarios exist where driver's do not know how to behave. For example, a driver may not understand how to safely perform a merge maneuver with a plurality of vehicles all traveling uniformly in the same lane. A driver may also not know how to proceed through an atypical intersection. Not knowing how to behave in these scenarios can result in accidents. In instances such as these, equipping vehicles with the capability to analyze, store, and share knowledge (e.g., knowledge of how to maneuver safely in certain situations) is promising and can improve vehicle safety and overall performance.

BRIEF SUMMARY OF THE DISCLOSURE

According to various embodiments of the disclosed technology, systems and methods for managing vehicles to mitigate risk to the vehicles due to anomalous driving behavior are provided.

In accordance with some embodiments, a method is provided. The method comprises detecting a performance result of first guidance performed by a first vehicle in a first driving environment that differs from an expected result associated with the first guidance associated with a second driving environment that corresponds to the first driving environment, identifying behavior executed by the first vehicle associated with the detected performance result based on a comparison between the first driving environment to the second driving environment, and, based on detecting that a second vehicle is executing the identified behavior, generate second guidance to mitigate the identified behavior being executed by the second vehicle.

In another aspect, an apparatus of a vehicular knowledge network is provided that comprises a memory storing instructions and a processor communicably coupled to the memory storing. The processor is configured to execute the instructions to obtain a performance result of first guidance performed by a first vehicle in a first driving environment, wherein the first guidance is associated with a second driving environment that corresponds to the first driving environment. The processor is also configured to execute the instructions to determine that the performance result differs from an expected result associated with the first driving environment; based on the determination, infer behavior of the first vehicle based on a comparison between the first driving environment to the second driving environment; and, based on detecting that a second vehicle is executing the identified behavior, generate second guidance configured to mitigate the inferred behavior being executed by the second vehicle.

In another aspect, a system is provided that comprises a memory storing instructions and a processor communicably coupled to the memory storing. The processor is configured to execute the instructions to identify driving behavior of a first vehicle in a first driving environment that deviates from expected driving behavior based on the first vehicle executing guidance, and generate compensation guidance configured to mitigate the identified driving behavior being performed by a second vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7 is an example computing component that may be used to implement various features of embodiments described in the present disclosure.

Figure 1A:
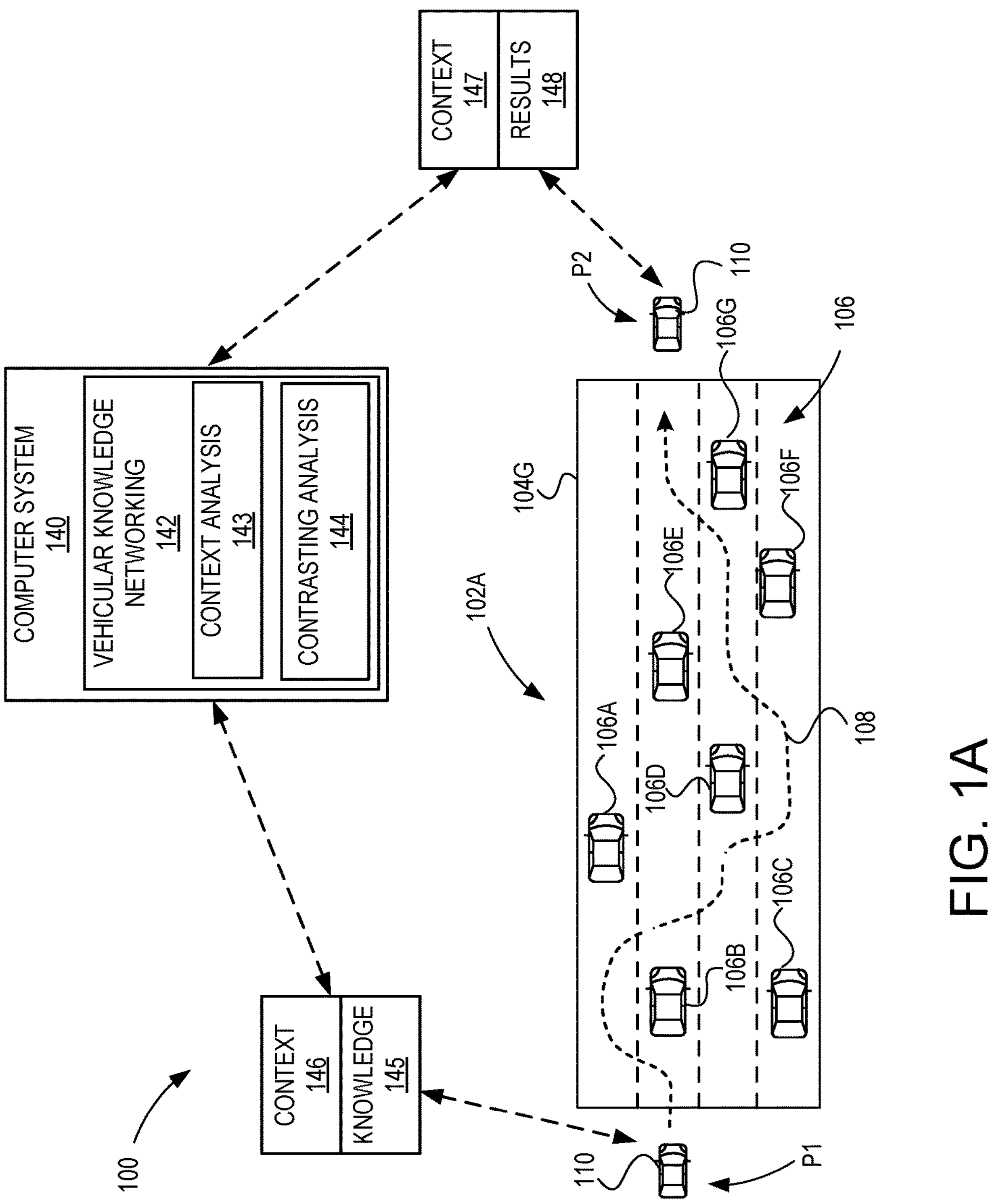
FIGS. 1A and 1B depict example illustrations of vehicle environments implementing a vehicular knowledge networking system in accordance with embodiments disclosed herein.

The figures are not exhaustive and do not limit the present disclosure to the precise form disclosed.

DETAILED DESCRIPTION

On occasion, in certain complicated driving environments, a driver may behave in a manner that differs from other drivers. In other words, a driver's behavior may contrast from other drivers. A driver's behavior can refer generally to actions, reactions, or operations, which may be performed or undertaken by a driver while operating a vehicle. At certain times while operating a vehicle, traffic conditions, environmental conditions, or the vehicle's condition and/or operating state may cause or result in a driver to take actions, reaction, or driving decision, which diverge from other drivers upon encountering such a condition. For example, when a driver enters into a roundabout, or when a driver is attempting to merge into a lane with a platoon of vehicles (i.e., a series of vehicles traveling at roughly the same speed in the same lane at roughly the same intervals), the driver may not know the right-of-way rules associated with the roadway or the traffic pattern. Another such example is when a driver misses their intended exit, and as a result may be confused as to whether they should refrain from performing any risky driving maneuvers (e.g., keep going and eventually loop back around) which then causes them to have to reroute. However, in this scenario, some drivers decide to engage in contrasting behavior in attempt to reach the correct exit, such as perform abrupt lane changes or slam on the brakes on the shoulder of the road, hoping they can still make the turn. In order to address the aforementioned and similar issues, equipping vehicles with capabilities to infer and share guidance in instances in these complicated driving environments (referred to herein as risky zone) may mitigate collision risk in these zones, thereby preventing vehicular damage, bodily injury and/or fatality, and significantly improving overall driver safety.

Some conventional methods to improve vehicle safety typically include providing feedback as the driver engages in an unsafe driving maneuver. For example, a current driver/vehicle safety system may produce an audible notification to warn the driver that they are attempting to move into a lane that is already occupied by another vehicle. Particularly, a current driver/vehicle safety system may beep if a driver attempts to change lanes and does not see another vehicle in his/her blind spot, in order to notify the driver of the vehicle in his/her blind spot. Although such safety alerts can be helpful, current driver/vehicle safety systems are often restricted to functioning while the driver is in the middle of a dangerous maneuver (e.g., providing little to no reaction time) which increases the risk of a catastrophic collision. In other words, these conventional driver/vehicle safety systems do not proactively provide guidance and/or knowledge that the driver can utilize while they are still approaching a risky zone. Although reactive feedback methods offer some level of prevention, a predictive system and method could prevent the drivers from engaging in the unsafe driving maneuver altogether.

In contrast to the aforementioned conventional systems, the disclosed system distinctly leverages communicating "knowledge" between vehicles (also referred to herein a vehicular knowledge networking) in a manner that can guide a driver through a complicated driving environment. In some examples, this "knowledge" can be used to proactively warn drivers in risky zones (e.g., risky and/or confusing driving environments). For instance, the disclosed system employs vehicular networking capabilities, such as vehicle-to-vehicle (V2) communication, to create and distribute contextual knowledge of risky zones. This knowledge can be received by a vehicle (e.g., a driver approaching said risky zone) early, allowing the driver to be preemptively prepared before entering the complicated driving environment and then safely maneuver once driving inside of the environment. This guidance may be referred to as knowledge-based guidance. Alternatively, with using conventional driver/vehicle safety systems, the driver would not be warned until they are already in the complicated driving environment, confused, and performing contrasting maneuvers that could cause a dangerous crash. Because it is so crucial to stay alert and aware of complicated driving environments, like risky zones, while driving, the disclosed embodiments utilize vehicular knowledge networking to implement a more effective safety system that equips vehicles to provide a priori guidance (e.g., prior to entering the risky zone) in a manner that thwarts driver confusion and enables the driver to be ready for maneuvering safely before reaching the risky zone. Restated, the vehicular knowledge network system and methods proposed herein, leverage knowledge to assist drivers in various driver/vehicle safety applications, such as risk reasoning and vehicular maneuvering in a manner that is preemptive and provides improvements over the reactionary (i.e., systems based on the driver engaging, or attempting to engage in a driving maneuver) limitations of conventional driver/vehicle safety systems.

Furthermore, the disclosed embodiments include a context-based knowledge forwarding process which ties a contextual meaning to knowledge, with the objective of ensuring that knowledge, and corresponding guidance, is received within the proper context and ultimately more accurate. As described herein, context is related to circumstances, descriptors, and situational characteristics for an event and/or location (e.g., driving environment) in terms that allow the environment to be understood and assessed by a computation system. With respect to vehicular knowledge networking, a "context" can be formed from several characteristics that describe aspects of the driving environment, such as road geometry, traffic flow, and the like, which are linked to a time when the knowledge was initially created. For example, knowledge of a complicated driving environment may be created using the data obtained from vehicles that were experiencing clear weather conditions while traveling a given location. This knowledge can be utilized by trained machine learning models to generate knowledge-based guidance, which can be provided to vehicles traveling in this environment. However, it may be detrimental if an ego vehicle currently driving in that same location, but in rainy weather conditions, attempts to apply that knowledge (having a "clear weather" context) for its complicated driving environment analysis. If knowledge is utilized in the wrong context, even when it is the "correct" knowledge (e.g., knowledge for the right location and/or event), the knowledge's accuracy may be undermined in a manner that negatively affects the vehicle's functions, for instance, leading to the vehicle making contrasting decisions relative to the knowledge, which impacts the overall driver/vehicle safety. In other words, the accuracy and usefulness of knowledge can be weakened when the knowledge is retrieved in a context that is dissimilar to the context in which it was created.

Thus, context-based knowledge forwarding, as disclosed herein, ensures that the proper knowledge is also retrieved in the proper context. For example, in accordance with context-based knowledge forwarding, a vehicle that queries knowledge within the context of traveling in rainy weather conditions, particularly receives knowledge that was created in a similar rainy weather context. The disclosed embodiments include a distinct process that assigns various contextual features to knowledge during a knowledge cycle, particularly while the knowledge is created (e.g., forming a contextual frame for knowledge), and later leverages these contextual features when the knowledge is forwarded to be utilized by entities in the vehicular knowledge network. A knowledge cycle, as described herein, includes several interrelated stages that involve dissemination and utilization of knowledge, including: knowledge creation; knowledge storing; knowledge networking; and knowledge refining (e.g., knowledge transfer and knowledge composition). The aforementioned knowledge cycle, the entities involved in the communication (e.g., vehicles, infrastructure, etc.), the vehicular network (e.g., vehicle-to-vehicle networking, vehicle-to-cloud networking, etc.), data (e.g., knowledge), and functionality related to creating and using knowledge can be referred to collectively as "vehicular knowledge networking." Consequently, by making certain that knowledge is used in the correct context, the disclosed embodiments ensure that knowledge is increasingly accurate and beneficial within the vehicular knowledge network, thereby realizing improved vehicle/driver safety features.

Figure 2:
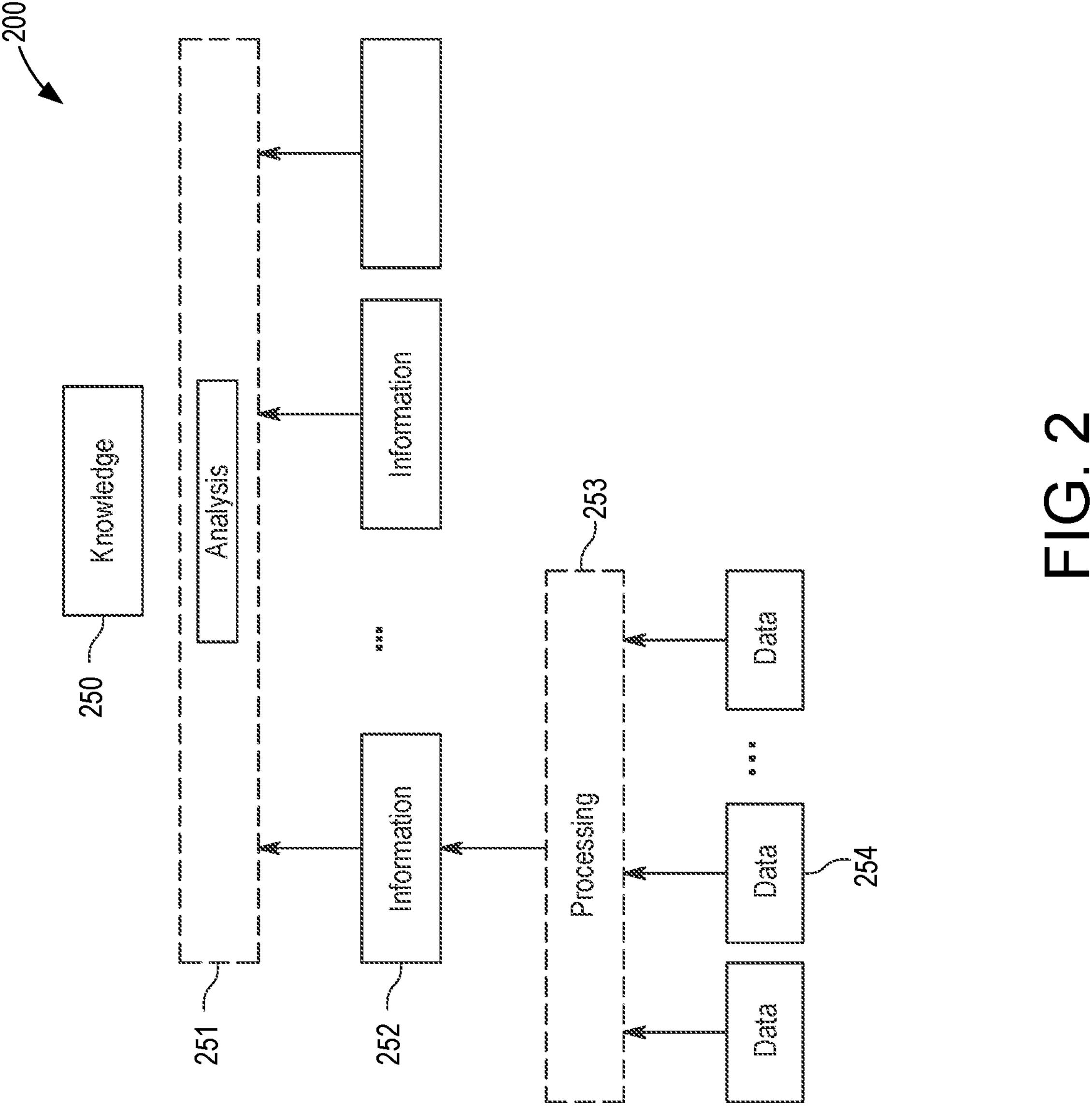
FIG. 2 depicts a conceptual diagram for a hierarchal architecture for data, information, and knowledge used in a vehicular knowledge network, for example the vehicular knowledge network of FIGS. 1A and 1B in accordance with embodiments disclosed herein.

As referred to herein, "knowledge" is conceptually a state of understanding that is obtained through experience and analysis of collected information, such as raw data. A function of the vehicular knowledge network, as disclosed herein, is the capability to transform data, such as raw data collected from vehicle sensors, into searchable knowledge, and subsequently to create and distribute this knowledge with various life cycles and relevance. Referring now to FIG. 2, a conceptual diagram depicts a hierarchy among data 254, information 252, and knowledge 250. As seen in FIG. 2, the hierarchy can include data 254 which is a piece of a recorded experience, such as vehicular speed mph, time t, position p that may be collected as raw data from the vehicle's sensors. In addition, the hierarchy can include information 252 which is pieces of data 254 that have been subjected to processing 253. Thus, data 254 can be contextual "meaningful." For instance, continuing with the example, the aforementioned raw data 254 from the vehicle can be processed to ascertain meaningful information 252 about the vehicle, such as "the vehicle was moving at a speed mph at time t and at position p." Further, FIG. 2 illustrates that information 252 can be subjected to analysis 251 in order to derive knowledge 250. It is knowledge 250 that is the most contextual-rich in comparison to data 254 and information 252, which is as illustrated by knowledge 250 being at the top of the hierarchy. As alluded to above, knowledge 250 can be considered as a fact, a belief extracted by analyzing patterns in information 252. For instance, knowledge 250 can be created through analysis 251 of multiple instances of information 252 and it is a fact or a belief that represents the hidden relationship among the information 252. Again, continuing with the example, knowledge 250 can be inferred insight surrounding the vehicle, where knowledge 250 identifies that sequential conflicts happen the most in an area X (related to vehicle's location P), thus X is a risky zone. The creation of knowledge 250 may require computationally hungry algorithms and a set of information 252 and/or data 254 that are potentially from multiple sources (e.g., vehicles). In operation, the vehicular knowledge network depicted in FIG. 2 organizes vehicle sensor measurements into data 254, information 252, and knowledge 250. Moreover, contextual data (also referred to herein as contextual features) for knowledge define a degree of similarity in data 254, information 252 and knowledge 250. For instance, types of data 254 that describe various situational conditions that the vehicle is traveling in at a location, such as road geometry, traffic flow/congestion, weather conditions, and the like, can be collected to form a contextual frame around that location, and ultimately a context for the knowledge 250 for that location. Restated, the disclosed embodiments use certain data 254 as contextual features that link a contextual relevance, namely a context, to the corresponding knowledge 250. Further, the contextual features can be analyzed to determine whether knowledge 250 is in the right context (e.g., having similar contextual features) for a specific vehicle query.

One challenge in determining knowledge for the right context is that it practically infeasible to cover all scenarios for a set of contextual features. There will likely be some scenarios and/or conditions that have not yet been seen in the raw data. As a result, knowledge associated with one set of contextual features may be used by a model to provide guidance to a vehicle experiencing a substantially similar set of contextual, but which differ in some aspect with the one set of contextual features. In some corner cases, the divergence between sets of contextual features may translate performance of the applied guidance (referred to herein as "performance result") that differs from an expected performance result. This contrasting result can represent performance degradations in the knowledge, whereby a vehicle experiences an desired or unexpected departure in performance of the knowledge-based guidance due to unforeseen or unexpected changes in a driving environments.

For example, a battery electric vehicles (BEVs) may be provided knowledge-based guidance according to a first set of contextual features obtained from a first driving environment in which the BEV is traveling. The knowledge-based guidance may be associated with a second set of contextual features indicative of a second driving environment, which may be substantially similar or the same as (e.g. corresponding to) the first set of contextual features. The knowledge-based guidance may be associated with a performance result that is expected after executing the guidance (an "expected performance result), which in this example may be an estimate of available driving range after executing the guidance. However, in this case, after executing the knowledge-based guidance the BEV determines a performance result that differs from the expected result (e.g., a lower than expected estimate of available driving range). This discrepancy between the actual performance result and the expected performance result may be an example of a contrasting result. As another example, a vehicle may travel to a destination according to a mapped knowledge-based guidance, but with a contrasting arrival times (e.g., actual arrival time differs from expected arrival time). These differences, which can be considered contrasting results, may represent corner cases in which performance deviates from expected results for an unknown or unforeseen reason.

Application developers can collect information and sensor measurement about corner cases and analyze these corner cases to refine knowledge and how the knowledge is translated to knowledge-based guidance. The refined knowledge can provide better guidance to a driver by compensating for the performance degradation. However, performance of guidance can depend on many varying, interacting, and complicated factors. For example, knowledge shared and the resulting guidance provided can be dependent on driving behavior of an ego vehicle, driving behavior of surrounding vehicles, interactions therebetween, traffic conditions, environmental conditions, the vehicles' condition and/or operating state, etc. Collecting large quantities of data related to these factors, transferring the data to model developers, analyzing the data (including performance results), and retrieving the refined application may not be practically feasible in certain cases. For example, it could take months or years to collect for an application developer to refine a model to properly compensate for each corner case, and during that time drivers may suffer by using a model that is unable to handle these corner cases. Furthermore, it may be not be feasible to generate knowledge of all corners cases that a vehicle may experience, by definition these corner cases are unforeseen situations or unknown scenarios that may not have been predictable to the model developer.

It may be advantageous to expediate compensating for performance degradation at the edge of a vehicular knowledge networking, while knowledge-based guidance models are refined by developers on the backend. Some approaches have been proposed that attempt to compensate for degradation in performance. For example, movement patterns (e.g., driving habits) have been analyzed using digital twin simulations to identify potential conflicts. In this case, drivers are coached to correct these habits and improve driving performance. In another example, metadata has been linked to anomaly detection, which can be used to dynamically update detection rules to improve detection accuracy. However, these approaches generally aim to retrieve and deliver the right knowledge with the right context in a timely manner. Any compensation for performance degradation, in the conventional systems, is addressed by dynamically updating the logic behind the guidance. Yet, as outlined above, performance can depend on many factors, and updating the logic behind the performance (e.g., updating the digital twin simulation and/or updating detection rules) may not be feasible.

Embodiments herein are provided that can compensate for performance degradation on the edge of the vehicular knowledge network, without requiring refining the knowledge and updating the guidance model. Embodiments disclosed herein leverage contrasting results analysis and guiding vehicles in a manner to improve performance. For example, embodiments disclosed herein can detect a contrasting result of knowledge-based guidance performed by a vehicle. In examples, a vehicle may be traveling in a first environment and may execute guidance that is based on knowledge corresponding to a second environment that is substantially similar or identical as (e.g., corresponding to) the first environment. A performance result of the guidance can be compared to an expected result associated with the knowledge (and thusly the knowledge-based guidance) to determine if the real-world performance result differs from the expected performance result. If the results differ, the real-world performance results are identified as a contrasting result. Said another way, the measured performance results of the guidance contrast relative to the expected results. In some embodiments, differing results may be determined where the difference therebetween is outside a defined deviation (e.g., 5%, 10%, etc. difference between real-world and expected results).

Based on (e.g., responsive to) identifying contrasting results, contrasting behavior analysis can be performed to identify contrasting driving behavior of the first vehicle. Contrasting behavior analysis may comprise inferring factors, such as driving behaviors and/or contextual features, differ between the first and second driving environments. The inferred contextual factors, which may be indicative of contrasting driving behavior, can be used to construct a compensation guidance plan (sometimes referred to as second guidance) that can be provided to vehicles as an initial compensation strategy to improve performance (e.g., bring real-world measured performance results in line with expected results) of the knowledge-based guidance by mitigating the contrasting behavior identified in other vehicles. The compensation guidance plan may be associated with the knowledge by tagging, such that when the knowledge is retrieved and used to provide knowledge-based guidance, the compensation guidance can be added to the knowledge-based guidance in real-time. Information of the first driving environment, including the identified contrasting behavior, can be uploaded to a centralized server for use by a developer to analyze and refine the guidance model.

In an example, the compensation guidance can be implemented by identifying a subsequently performed contrasting behavior (e.g., contrasting behavior performed after constructing the compensation guidance) by a vehicle and then guiding the vehicle to mitigate this subsequently performed contrasting driving. For example, in the above BEV example, embodiments disclosed herein learn that aggressive driving (e.g., unnecessary acceleration and deceleration) is a cause of the contrasting results. Then, as an initial compensation, embodiment disclosed herein construct compensation guidance that guides vehicles with speed and lane change advice to avoid such aggressive driving.

While examples provided herein are described as detecting contrasting results of knowledge-based guidance, the scope of the embodiments is not intended to be limited to knowledge-based guidance only. Embodiments disclosed herein may be able to detect contrasting results from any guidance or model, not only knowledge-based guidance. For example, a navigation application may generate guidance in the form of map with an expected arrival time. A contrasting result may be detected in a case where a real-world arrival time differs from the expected arrival time.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1A is a schematic diagram of an example environment 102 in which a vehicular knowledge network system 100 can be implemented. The example operating environment 102 includes a vehicle 110, and one or more vehicles 104A-104G traveling in a driving environment on a section of roadway 106. The vehicles 104A-104G may be traveling in any configuration or arrangement. The roadway 106 may feature any type of traffic signals, roadway patterns, roadway hazards etc. It should be understood that the operational environment 102 in FIG. 1A is described for purposes of illustration and is not intended to be limiting, thus the described vehicular knowledge networking and performance degradation compensation capabilities can implement enhanced driver/vehicle guidance functions that are similarly applicable to various other types of potentially risky, confusing, or dangerous driving environments that are not shown (e.g., roundabouts, exits, and the like).

The embodiments disclosed herein may be implemented with any of a number of different vehicles and vehicle types. For example, embodiments disclosed herein may be used with automobiles, trucks, motorcycles, recreational vehicles and other like on-or off-road vehicles. In addition, the principals disclosed herein may also extend to other vehicle types as well. Although the example described with reference to FIG. 1A is a type of semi-autonomous vehicle, the systems and methods described herein can be implemented in other types of vehicles including autonomous vehicles, vehicles with automatic controls (e.g., dynamic cruise control), or other vehicles. In some examples, the vehicle 110 may be implemented as vehicle 300 described in connection with FIG. 3. The disclosed embodiments can be implemented in any type of vehicles including gasoline- or diesel-powered vehicles, fuel-cell vehicles, hybrid-electric vehicles (HEV), BEVs, or other vehicles.

Vehicle 110 can be a semi-autonomous vehicle, such as a vehicle having assisted driving capabilities, which also implements the vehicular knowledge networking and improved knowledge cycle functions, as disclosed herein. "Semi-autonomous operational mode" means that a portion of the navigation and/or maneuvering of the vehicle 110 along a travel route is performed by one or more computing systems, and a portion of the navigation and/or maneuvering of the vehicle 110 along a travel route is performed by a human driver. In examples disclosed herein, the navigation and/or maneuvering may be based on knowledge-based guidance. One example of a semi-autonomous operational mode is when an adaptive cruise control system is activated. In such case, the speed of a vehicle 110 can be automatically adjusted to maintain a safe distance from a vehicle ahead based on data received from on-board sensors, but the vehicle 110 is otherwise operated manually by a human driver. Upon receiving a driver input to alter the speed of the vehicle (e.g., by depressing the brake pedal to reduce the speed of the vehicle), the speed of the vehicle is reduced. Thus, with vehicle 110 operating as a semi-autonomous vehicle, a response can be partially automated. In an example, the controller communicates a newly generated (or updated) control to the vehicle 110 operating as a semi-autonomous vehicle. The vehicle 110 can automatically perform some of the desired adjustments (e.g., accelerating) with no human driver interaction. Alternatively, the vehicle 110 may notify a driver that driver input is necessary or desired in response to a new (or updated) safety control.

Alternatively, or in addition to the above-described modes, vehicle 110 can have one or more autonomous operational modes. As used herein, "autonomous vehicle" means a vehicle that is configured to operate in an autonomous operational mode. "Autonomous operational mode" means that one or more computing systems of the vehicle 110 are used to navigate and/or maneuver the vehicle along a travel route with a limited level of input from a human driver which varies with the operational mode. In examples disclosed herein, the autonomous operation may be based on knowledge-based guidance. As such, vehicle 110 can have a plurality of autonomous operational modes, where each mode correspondingly responds to a controller, with a varied level of automated response. In some embodiments, the vehicle 110 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 110, responses can be highly, or fully, automated. For example, a controller can be configured to communicate controls so as to operate the vehicle 110 autonomously and safely. After the controller communicates a control to the vehicle 110 operating as an autonomous vehicle, the vehicle 110 can automatically perform the desired adjustments (e.g., accelerating or decelerating) with no human driver interaction. Accordingly, vehicle 110 can operate any of its components autonomously, such as an engine.

The plurality of vehicles depicted in the example environment 102 of FIG. 1A includes the vehicle 110 and vehicles 104A-104G. Vehicles 104A-104G may each provide similar functionality to the vehicle 110. FIG. 1A depicts the vehicle 110 and vehicles 104A-104G as a network of connected vehicles. As used herein, "connected vehicle" refers to a vehicle that is actively connected to edge devices, other vehicles, and/or a cloud server via a network through V2X communication comprising V2I, V2C, C2V and/or V2V communications. For example, the vehicle 110 and the vehicles 104A-104G are connected vehicles that include communication circuitry (and other hardware/software providing such capabilities installed thereon) which is capable of wireless communication (e.g., V2X, V2I, V2V, etc.) that enables active connections to other vehicles and/or communication devices. As an example, vehicles 110, 104A-104G communicate with each other using vehicle-to-vehicle (V2V) and communicate to the remote cloud and/or the computer system 140 (or edge server) through the and vehicle-to-cloud (V2C) communication. Accordingly, the vehicle 110, vehicles 104A-104G, and the computer system 140 being within the same vicinity can be considered a hub of the vehicular knowledge network system 100. Generally, vehicular knowledge network system 100 supports several functions, including, but not limited to: executing a knowledge cycle (e.g., including creating knowledge), as disclosed herein; communicating requests to knowledge nodes (e.g., vehicles 110, 104A-104G) for one or more instances of knowledge; forwarding the requests toward appropriate knowledge nodes, which are expected to have the requested knowledge (e.g., nodes closer to the geographical region), based on contextual features; communicating responses to the requests from other knowledge nodes if it has the requested knowledge in its own knowledge base or from edge server; and communicating the requested knowledge to communication points and knowledge nodes within the system 100 based on contextual features. Thus, by implementing aspects of vehicular knowledge networking, the vehicle 110 can have its own knowledge base, which can be shared and/or communicated with a remote cloud and/or computer system 140 (e.g., edge server) and other vehicles 104A-104G.

According to the embodiments, the vehicle 110 can be configured to implement the vehicular knowledge networking and performance degradation compensation capabilities, as disclosed herein. That is, for example, each vehicle 110 can be equipped to convert vehicle data generated and exchanged among vehicles into knowledge 145 (e.g., an example of knowledge 250), where the knowledge 145 provides insight regarding traffic events, driving environment, driving conditions, congestion, and the like. Furthermore, the vehicle 110 can utilize knowledge 145 in order to optimize various vehicular applications. For example, in the example of FIG. 1A, the vehicle 110 can leverage vehicular knowledge networking in order to execute a guidance application. Thus, by implementing guidance application, vehicle 110 can quantify the conditions in their environment, identify the knowledge of the conditions, and leverage the knowledge to generate guidance for the driver to improve vehicle operation.

In the example of FIG. 1A, entities in the vehicular knowledge network, namely the vehicle 110, vehicles 104A-104G, and computer system 140, can be configured to implement various aspects of vehicular knowledge networking disclosed herein. In one or more embodiments of the present disclosure, functions supporting vehicular knowledge networking and the improved knowledge cycle can be performed as part of a training process, which may be carried out using a computer system 140. In the example of FIG. 1A, the computer system 140 is depicted as a server, for example an edge server, within the vehicular knowledge network system 100. As seen in FIG. 1A, the computer system 140 can be configured to include a vehicular knowledge networking system 142, a context analysis system 143, and a contrasting analysis system 144. For example, the computer system 140 might include one or more processors, controllers, control modules, or other processing devices, where the vehicular knowledge networking system 142, the context analysis system 143, and the contrasting analysis system 144 may be implemented as hardware processor(s). The vehicular knowledge networking system 142, the context analysis system 143 contrasting analysis system 144 may also be implemented as software on the computer system 140, such as instructions, machine-readable code, or computer program components. In another example, knowledge networking system 142, the context analysis system 143, and the contrasting analysis system 144 may be implemented as a combination of hardware and software.

The computer system 140 may be an edge server that resides as a backend system relative to vehicles 110, and 104A-104G. By way of example, knowledge 145 can be created on the computer system 140, operating as an edge server, using vehicle data and/or information received from connected vehicles, such as vehicles 120 and 104A-104G, for example, as described in connection with FIG. 3. Subsequently, knowledge 145 can be distributed throughout the vehicular knowledge network system 100, which can be used for a knowledge-based guidance applications to control vehicular operations. As an illustrative example, FIG. 1A depicts knowledge 145, created at computer system 140, distributed through the communications to vehicle 110 at point P1. For instance, once optimization of the knowledge cycle has converged on the computer system 140, knowledge 145 can be uploaded to a computer system of the vehicle 110, for example in the form of trained machine learning models, and used for autonomous, semi-autonomous, assisted, or other driving systems to assist operations of vehicle 110 (e.g., autonomously and/or semi-autonomously) as it travels from point P1 to point P2. It should also be appreciated upon studying the present disclosure that in one or more embodiments the functions or elements of computer system 140 (including the vehicular knowledge networking system 142 and the context analysis system 143) may reside on board a vehicle, such as vehicle 110. For example, all or part of computer system 140 may reside within vehicle 110 and their functionalities may be performed thereby.

Entities of the vehicular knowledge network system 100 can be configured to execute context-based knowledge forwarding techniques. Accordingly, the computer system 140 can receive a set contextual features from one or more vehicles (e.g., vehicles 110 and/or 104A-104G), where the set of contextual features represent various conditions of operating environment 102. For example, vehicles that have previously traversed the operating environment 102 of FIG. 1A may have leveraged their capabilities (e.g., sensors) to collect vehicle data that was descriptive of the conditions experienced at the time while driving through the roadway 106, such as traffic flow, vehicle/driver type, congestion, type of objects at the location, risk caused by other drivers, weather conditions, and the like. This vehicle data, representative of a set of contextual features of the operating environment 102, can be received and further analyzed by the computer system 140 (context analysis system 143) to provide a "context" for the knowledge that will be created about the section of roadway 106 according to the set of contextual features, as described above in connection with FIG. 2. That is, for example, the computer system 140 can analyze the vehicle data (e.g., generated by a plurality of vehicles) of a location, in order to generate one or more contextual feature maps (also referred to as a set of contextual features) that infer a context surrounding knowledge corresponding to the contextual features comprised thereof. According to the embodiments disclosed herein, the context for knowledge (e.g., contextual feature maps) can be created concurrently with the knowledge itself, so as to eliminate additional overhead and/or delays when the knowledge is actually needed (e.g., knowledge forwarded to entities of the vehicular knowledge network). In other words, the context that corresponds to an instance of knowledge can be created during its knowledge cycle (e.g., creating the knowledge). The knowledge cycle can be described as the overall steps for creating and/or distributing knowledge in vehicular knowledge networking, such as vehicular knowledge network system 100. Generally, a knowledge cycle that may be implemented by the vehicular knowledge networking system 142 includes several steps, including but not limited to: knowledge creation; knowledge storage, where the created knowledge is stored and placed intelligently such that a high number of vehicles can access and consume it; knowledge networking, which involves developing the network topology and query/distribution of knowledge; knowledge transfer and knowledge composition, which involves refinement of the knowledge such as merge/accumulation of knowledge.

FIG. 1A depicts the computer system 140 as an entity implementing aspects of the context-based forwarding, having context analysis system 143 which is configured to execute the context-based knowledge forwarding techniques disclosed herein. Details of the context-based knowledge forwarding are described in U.S. patent application Ser. No. 18/300,367, the disclosure of which is incorporated herein by reference in its entirety.

Generally, the context analysis system 143 can be configured to perform "knowledge context" related functions of the disclosed embodiments, including: obtaining contextual features specific to a location before knowledge is created; analyzing the contextual features to create contextual feature maps (inferring the context) specific to a location while its knowledge is created; retrieving the right knowledge without additional delay; and preparing knowledge based on its derived context beforehand to maximize the benefits. A design goal of vehicular knowledge networking is to maximize the benefits of its knowledge (e.g., knowledge is useful/utilized by a large number of entities), thus having insight into the context for knowledge can be used to dynamically make knowledge more beneficial, ensuring that the right knowledge is forwarded to an entity in the right context. Therefore, entities in the vehicular knowledge network system 100, such as vehicle 110, may leverage potentially "improved" knowledge 145 resulting from an improved knowledge cycle (e.g., optimized by the disclosed improved knowledge cycle techniques). Furthermore, forwarding knowledge based on its context may provide insight regarding the driving environment in a manner that improves guidance of the vehicle through the risky zone thereby improving overall vehicle/driver safety.

FIG. 1A depicts knowledge 145, which is communicated throughout the vehicular knowledge network system 100, and can be created by a single vehicle and/or group of vehicles (e.g., vehicular micro cloud) cooperatively. Thus, the vehicle 110 and surrounding vehicles 104A-104C can be referred to as knowledge nodes within the vehicular knowledge network system 100. Alternatively, or in addition, knowledge 145 can be created at the edge (e.g., by a computer system 140) the through collaboratively collected data from vehicles within the range of the network, such as vehicles 130, 104A-104G. The knowledge creation can include all the vehicles inside of a group, shown in FIG. 1A as vehicles 110, 104A-104G, but might potentially also be extended to surrounding vehicles or a specific region. According to the embodiments, the created knowledge 145 can be further associated with metadata.

For example, vehicles 110, 104A-104G can be equipped with on-vehicle sensors that collect real-time data while driving, where the data (e.g., speed, temperature, road conditions, etc.) is pertinent to driving and/or maneuvering operations. This data, also referred to herein as raw sensor data, can then be communicated, stored, analyzed in accordance with various vehicular networking technologies, and analyzed in order to transform the data into knowledge 145. For instance, the speed at which different vehicles move along a road in a certain location can be collected, by the respective vehicles, over time. The raw sensor data (referred to herein as vehicle data) can be processed in accordance with the disclosed vehicular knowledge networking capabilities to provide meaningful information in the form of knowledge 145 and the contextual features which constitute its corresponding context 146. Multiple pieces of raw sensor data, possibly from different vehicles 110, 104A-104G can be used to infer inner relationships or repeating patterns and contextual relevance that may be found in data, thereby extracting insight on this data that can serve as knowledge 145 and its context 146. For example, the edge server, namely computer system 140, and the vehicle 110 may have the capabilities to create contextual features maps for operating environment 102, and extract meaningful contextual information that enables the context analysis system 143 to create context 146 for knowledge 145.

In the example of FIG. 1A, knowledge 145 can be related to a context 146 for a knowledge-based guidance application. For instance, knowledge 145 can provide insight on a type of maneuvering or other vehicle operating conditions that are often experienced by vehicles according to the context 146, which can include the specific location of the section of roadway 106. Context 146 can provide insight to static properties for the specific location (and its knowledge) including, but not limited to: the location, road geometry, traffic rules, and the like. Context 146 can also provide insight to dynamic properties for the specific location (and its knowledge) including, but not limited to: traffic flow, vehicle/driver type, congestion, type of objects at the location, risk caused by other drivers, etc. Thus, the context 146 provides a contextual relationship inferring the conditions surrounding location at a time when the knowledge 145 was created.

Furthermore, the context analysis system 143 can be configured to analyze a query for knowledge based on its context, such that only the knowledge having a similar context is forwarded in response to the query. For example, vehicle 110 can leverage its capabilities (e.g., sensors) to collect vehicle data descriptive of the conditions currently experienced while driving through the roadway 106. The conditions can be packaged as a query that can be used to retrieve knowledge 145. In an example, knowledge 145 can be returned to vehicle 110 when the detected conditions are at least substantially similar to, if not identical to, context 146 associated with knowledge 145. Conditions may be considered substantially similar where the conditions detected by vehicle 110 includes at least a threshold amount (e.g., percentage, number, or the like) of the contextual features included in context 146. The threshold in some examples may be 80% (e.g., 8 conditions in a case where context 146 contained 10 contextual features), but other thresholds may be used as desired. Thus, for example, current conditions detected by vehicle 110 at point P1 are descriptive of 80% or more of contextual features included in context 146, then knowledge 145 may be uploaded to vehicle 110 for providing knowledge-based guidance between to point P2. Thus, the vehicular knowledge networking system 100 forms a knowledge network among entities (e.g., vehicles 110, 104A-104C), where vehicles 110, 104A-104C can deduce and share knowledge 145 for enhanced driver/vehicle safety applications (e.g., risk reasoning) instead of large volumes of raw sensor data and information (which reduces the cost and volume of communication).

In operation, when the driver of vehicle 110 approaches point P1 of roadway 106, vehicle 110 may send a request to the edge server (or cloud), specifying a set of current condition tags based on the vehicle data collected using the capabilities of vehicle 110 to receive knowledge 145 regarding the driving environment 102. Note that the vehicle data may include information obtained from one or more of vehicles 104A-104G. The set of current condition tags (e.g., a set of contextual features describing the current conditions) of the operating environment 102 is evaluated to retrieve knowledge corresponding to a set of conditions that are substantially similar or identical to the set of current condition tags. For instance, in the operational example, the vehicle 110 can generate a query for knowledge regarding the current conditions at point P1, and use its vehicle sensors (e.g., detecting presence of vehicles 104A-104G) to obtain several contextual features associated with the current "context" of operating environment 102. As a result of sensing presence and/or location of the other vehicles 104A-104G, the vehicle 110 can obtain data regarding the traffic flow of roadway 106, for example, which is communicated to the computer system 140 as contextual features. These contextual features generated at the time the ego vehicle 130 is requesting knowledge for the intersection (e.g., vehicle is approaching the atypical intersection) are analyzed by the context analysis system 143. Accordingly, the context analysis system 143 employs its context-based knowledge forwarding capabilities, such that the knowledge 145 corresponding context 146 is retrieved that matches (e.g., substantially similar or identical to) the current context of the query. Receiving knowledge 145 having a context 146 that corresponds to current conditions suggests that the knowledge will be more beneficial for the vehicle 110 to make an accurate risk analysis and initiate an appropriate safety response that is most applicable to the atypical intersection with high traffic. The knowledge 145 can be shared with the vehicle 110 through V2C communications.

As previously described, the vehicle 110 can then execute knowledge-based guidance applications (such as safety maneuvers) as a result of the knowledge 145 received. Furthermore, due to context-based knowledge forwarding, the knowledge 145 has a specific contextual relationship operating environment 102 such that that the executed maneuvers performed based on knowledge 145 are applicable for the current conditions, or context, of the risk zone. As an example, if the knowledge 145 indicates that operating environment 102 is a risky zone and/or the nearby vehicles 104A-104G are identified as risky user, certain safety maneuvers may be autonomously performed, such as slowing down, because of the risk and the situational context of the driving environment.

The vehicular knowledge networking system 100 and context-based knowledge forwarding techniques can thus realize enhanced safety applications, such as risk reasoning, based on knowledge of a current traffic environment which improves the vehicle/driver safety by making preventive and proactive decisions to minimize the threat for all vehicles that are and/or will be affected by the riskiness. Furthermore, by distributing knowledge (as opposed to large amounts of raw data) and analyzing context for that knowledge using a distinct pre-process (e.g., contextual feature maps are used to prepare the knowledge cycle beforehand) the knowledge networking system 100 may mitigate large delays and overhead which is not tolerable in time-critical responses.

In the example of in FIGS. 1A, a knowledge cycle can involve the computer system 140 collecting vehicle sensor data from, at least, vehicle 110 and performing knowledge creation from that data. Then, during a knowledge creation stage of the knowledge cycle, an AI/ML modeling approach can be applied to the collected data to create knowledge. Knowledge can be created by a single and/or cluster of vehicles cooperatively or it can be created at the edge through collaboratively collected data from vehicles. The knowledge creation includes all the vehicles inside the cluster but might potentially also be extended to surrounding vehicles or a specific region. The created knowledge is associated with a set of knowledge tags and stored in Knowledge Base (KB). The knowledge can be placed on edge/cloud server according to mobility of vehicles approaching the risky zone. The system uses Vehicle-to-Network communication to network the knowledge. The knowledge is transferred to other locations according to geometry features of road sections. The knowledge is composed with another knowledge based on similarity and used parameter is time of day. The knowledge cycle includes all steps, and the performance is beneficial (i.e., knowledge is delivered to more high number of vehicles).

In some cases, the knowledge-based guidance application may experience performance degradation following execution thereof. For example, guidance executed according to given knowledge may correspond to an expected performance after the guidance is completed, for example, after executing certain maneuvers. However, in some cases, the actual real-world performance of the guidance may deviate from the expected results due to unforeseen conditions not part of the context 146 or conditions of context 146 that were not present in the current conditions. As an illustrative example, as shown in FIG. 1A, performance of knowledge-based guidance based on knowledge 145 may be an estimate of available driving range. According to context 146, knowledge 145, and thus the corresponding guidance, may be associated with an expected driving range estimation (e.g., 145 miles) as an expected performance result. However, after executing the guidance, vehicle 110 may estimate a real-world available driving range based on a current state of charge of it battery that has a discrepancy relative to the expected result (e.g., 50 miles or other discrepancy). The discrepancy represents a performance degradation in the guidance model that leveraged the knowledge 145, which can result in unpredictability in the guidance and reduce driver acceptance.

To compensate for the performance degradation, without having to refine the model and knowledge logic, vehicular knowledge network system 100 can be implement performance degradation compensation functionality, as disclosed herein. That is, for example, computer system 140 can receive performance results 148 of performed knowledge-based guidance from vehicle 110. For example, knowledge 145 can be retrieved based on a current set of contextual features at point P1 obtained by vehicle 110, which can be used to provide guidance to vehicle 110 based on the current set of contextual features. After executing the guidance, vehicle 110 can determined performance results 148, for example, using the on-board sensor. Performance results 148 can be packaged with the current context 147 and provided to computer system 140. The current context 147 may be the current set of contextual features used to retrieve knowledge 145. Computer system 140 can execute contrasting analysis system 144 to analyze the performance results 148 and determine that the performance results 148 differ from expected result associated with the knowledge 145, which computer system 140 can tag (or otherwise labeled) as a contrasting result. In some embodiments, a difference may be based on a divergence between the expected results and performance results 148 that is outside a defined threshold deviation, for example, plus-or-minus an amount of deviation relative to the expected result (e.g., 5%, 10%, etc. difference between real-world and expected results).

Once a contrasting result is identified, computer system 140 may be configured (e.g., contrasting analysis system 144) to execute contrasting behavior analysis to infer contextual factors that may have caused the contrasting result. For example, computer system 140 may identify differences in contextual features between the current set of contextual features relative to the set of contextual features associated with the expected result. For example, the expected result may correspond to context 146 by virtue of association with knowledge 145. Contrasting analysis system 144 may compare the context 147 to the context 146 and identify any contextual features that are present in context 146 and absent from current context 147 or present in current context 147 and absent from context 146. These differences in contextual features can be stored as inferred contrasting factors.

As an illustrative example, as shown in FIG. 1A, the context 146 may comprise static properties, such as, the specific location of roadway 106, road geometry, and traffic rules, along with dynamic properties, such as, traffic flow, congestion, type of objects at the location, risk caused by other drivers, and weather conditions. Context 146 may be used to retrieve knowledge 145 and guidance based on knowledge 145 may be associated with an expected result comprising an estimated driving range of N miles. When the guidance is executed by vehicle 110, vehicle 110 travels along the section of roadway 106 along path 108 to point P2. In this case, path 108 may exhibit aggressive driving behavior by weaving through high-traffic congestion, including aggressive changes in speed. At point P2, vehicle 110 computes a performance result 148 of the guidance and returns an estimate M miles, which differs from the expected results. Vehicle 110 provides its current context 147, including path 108, to computer system 140 along with performance results 148. Computer system 140 determines performance results 148 is in contrast with the expected result (e.g., a contrasting result) and infers that the path 108 and driving behavior included with path 108 are contrasting factors. In this case, path 108 may be the only contrasting contextual factor, which means that, according to the context-based knowledge forwarding capabilities, knowledge 145 was the correct knowledge for the current context. However, since there were circumstances unforeseen in the model, the performance was sub-optimal. The path 108 and driving behavior included with path 108 may be examples of dynamic features.

Figure 1B:
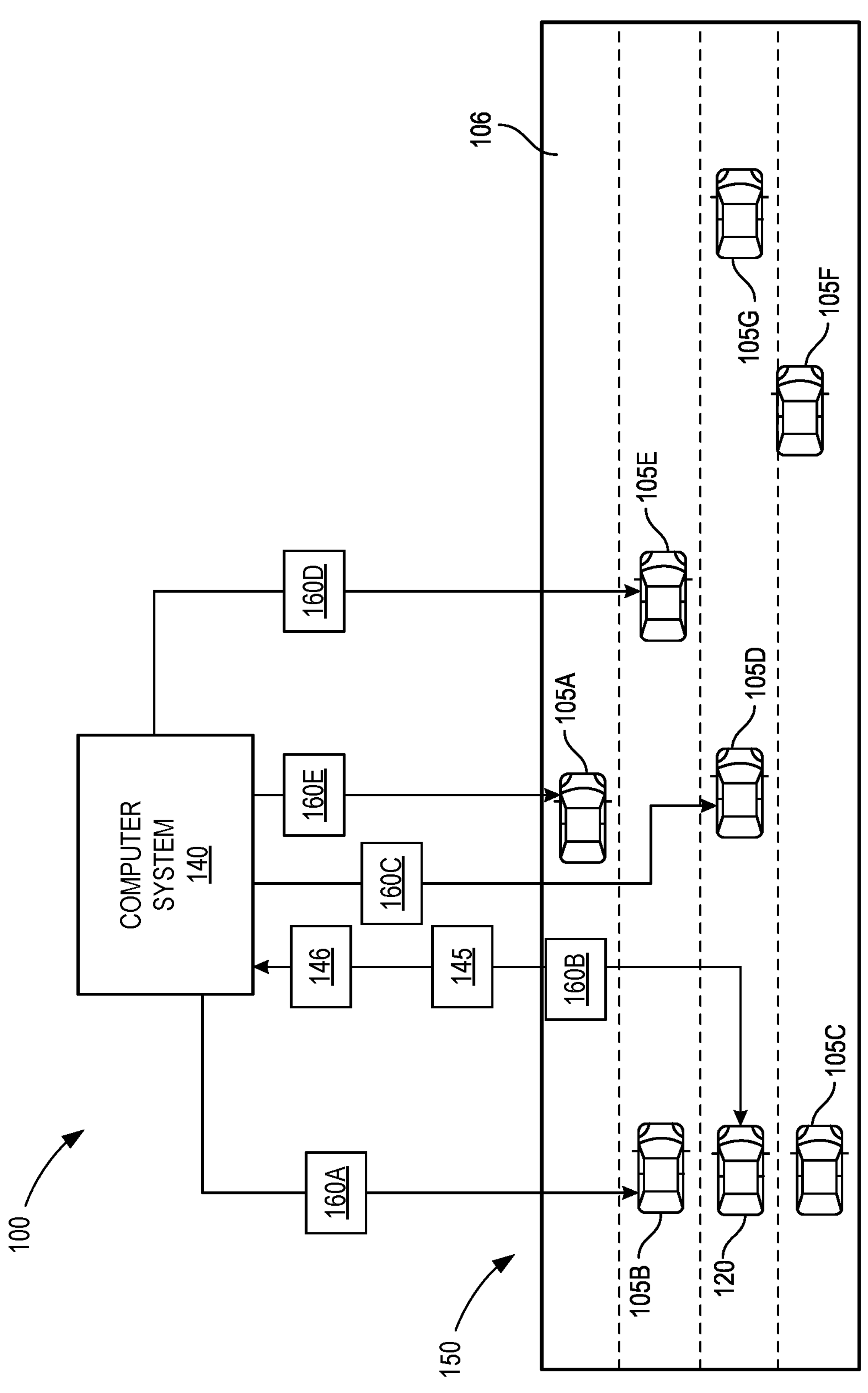

Upon identifying the contrasting behavior, computer system 140 can take actions to mitigate the inferred contrasting behavior as a compensation strategy for the contrasting result (e.g., representative of performance degradation in the model). For example, FIG. 1B is a schematic diagram of an example environment 150 in which a vehicular knowledge network system 100, as described above, can be implemented to mitigate performance degradation. The example operating environment 150 includes ego vehicle 120, and one or more vehicles 105A-105G traveling in a driving environment on a section of roadway 106. Vehicles 120 and 105A-105G may each provide similar functionality to the vehicle 110. As described above, in this example, vehicles 120 may retrieve knowledge 145 based on current conditions that are substantially similar as or the identical to context 146. However, unlike in operating environment 102 above, computer system 140 may have executed its performance degradation compensation capabilities to inferred contrasting behavior from a prior vehicle (e.g., vehicle 110), as described above. A contrasting behavior, such as that described above in connection with FIG. 1A, may be included in the current conditions detected by vehicles 120. Computer system 140 may execute knowledge 145 based on the current conditions being substantially similar or identical to context 146, as described above. Additionally, context analysis system 143 may be configured to recognize the contrasting behavior from the current conditions. Based on this recognition, along with uploading knowledge 145 to ego vehicle 120, computer system 140 may be configured to issue one or more additional guidance, in the form of control commands 160A-160D, to ego vehicle 120 and/or surrounding vehicles 105A-105D.

The additional guidance (or compensation guidance as sometimes referred to herein) may be configured to guide the ego vehicle 120 and/or vehicles 105A-105D, autonomously or semi-autonomously, to mitigate the inferred contrasting behavior of vehicles 120. For example, in the case of aggressive driving behavior of path 108 exhibited by vehicles 120, control commands 160B-160D may be configured to coordinate the vehicles 105A-105D into a platoon of vehicles that reduce the likely hood of vehicle 120 executing aggressive behavior. As another example, alone or in combination of the coordination, control command 160A may be issued that provides guidance to reduce speed or weaving maneuvers. The control commands 160A-160D may be packages as part of knowledge 145, for example, by updating knowledge 145 according to the contrasting behavior.

Additional examples and explanation of mitigation techniques can be found, for example, in U.S. application Ser. No. 17/959,866, filed on Oct. 4, 2022, entitled "SYSTEMS AND METHODS TO MANAGE DRIVERS UNDER ABNORMAL DRIVING;" U.S. application Ser. No. 17/005,258, filed on Aug. 27, 2020, entitled "SYSTEMS AND METHODS TO GROUP AND MOVE VEHICLES COOPERATIVELY TO MITIGATE ANOMALOUS DRIVING BEHAVIOR;" and U.S. Pat. No. 11,414,088, filed on Jan. 16, 2020, entitled "ANOMALOUS DRIVER DETECTION SYSTEM," the disclosures of which are incorporated herein by reference in their entirety.

Figure 3:
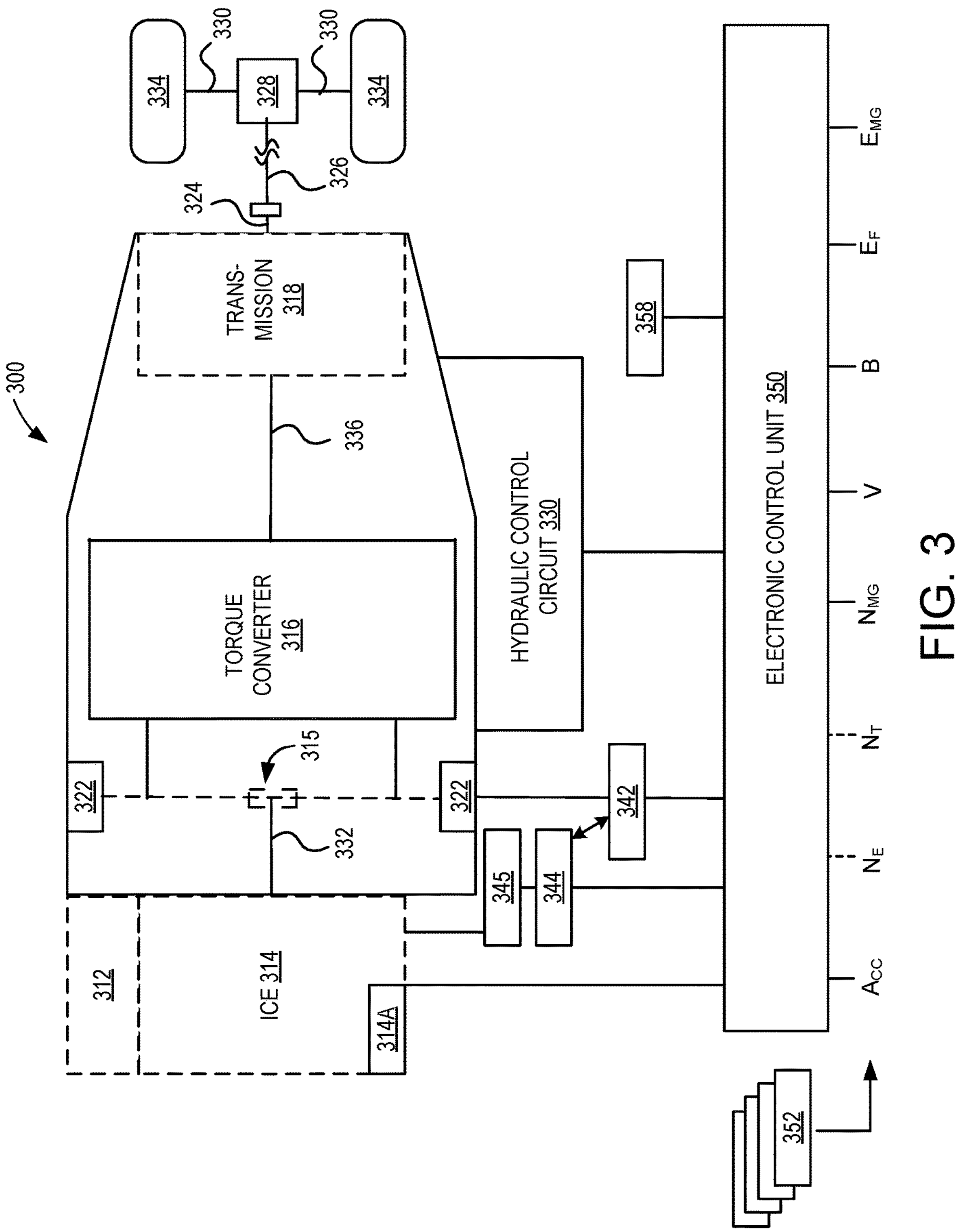
FIG. 3 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 3. Although the example described with reference to FIG. 3 is a hybrid type of vehicle, the systems and methods for performance degradation compensation can be implemented in other types of vehicle including gasoline- or diesel-powered vehicles, fuel-cell vehicles, electric vehicles, or other vehicles.

FIG. 3 illustrates a drive system of an example vehicle 300 that may include an internal combustion engine 314 and one or more electric motors 322 (which may also serve as generators) as sources of motive power. Vehicle 300 may be an example implementation of vehicle 110, 120, 104A-104G and/or 105A-105G of FIGS. 1A and 1B. Driving force generated by the internal combustion engine 314 and motors 322 can be transmitted to one or more wheels 334 via a torque converter 316, a transmission 318, a differential gear device 328, and a pair of axles 330.

As an HEV, vehicle 300 may be driven/powered with either or both of engine 314 and the motor(s) 322 as the drive source for travel. For example, a first travel mode may be an engine-only travel mode that only uses internal combustion engine 314 as the source of motive power. A second travel mode may be an EV travel mode that only uses the motor(s) 322 as the source of motive power. A third travel mode may be an HEV travel mode that uses engine 314 and the motor(s) 322 as the sources of motive power. In the engine-only and HEV travel modes, vehicle 300 relies on the motive force generated at least by internal combustion engine 314, and a clutch 315 may be included to engage engine 314. In the EV travel mode, vehicle 300 is powered by the motive force generated by motor 322 while engine 314 may be stopped and clutch 315 disengaged.

Engine 314 can be an internal combustion engine such as a gasoline, diesel or similarly powered engine in which fuel is injected into and combusted in a combustion chamber. A cooling system 312 can be provided to cool the engine 314 such as, for example, by removing excess heat from engine 314. For example, cooling system 312 can be implemented to include a radiator, a water pump and a series of cooling channels. In operation, the water pump circulates coolant through the engine 314 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 314. In other applications, either or both the water pump and the fan may be operated by electric current such as from battery 344.

An output control circuit 314A may be provided to control drive (output torque) of engine 314. Output control circuit 314A may include a throttle actuator to control an electronic throttle valve that controls fuel injection, an ignition device that controls ignition timing, and the like. Output control circuit 314A may execute output control of engine 314 according to a command control signal(s) supplied from an electronic control unit 350, described below. Such output control can include, for example, throttle control, fuel injection control, and ignition timing control.

Motor 322 can also be used to provide motive power in vehicle 300 and is powered electrically via a battery 344. Battery 344 may be implemented as one or more batteries or other power storage devices including, for example, lead-acid batteries, nickel-metal hydride batteries, lithium ion batteries, capacitive storage devices, and so on. Battery 344 may be charged by a battery charger 345 that receives energy from internal combustion engine 314. For example, an alternator or generator may be coupled directly or indirectly to a drive shaft of internal combustion engine 314 to generate an electrical current as a result of the operation of internal combustion engine 314. A clutch can be included to engage/disengage the battery charger 345. Battery 344 may also be charged by motor 322 such as, for example, by regenerative braking or by coasting during which time motor 322 operate as generator.

Motor 322 can be powered by battery 344 to generate a motive force to move the vehicle and adjust vehicle speed. Motor 322 can also function as a generator to generate electrical power such as, for example, when coasting or braking. Battery 344 may also be used to power other electrical or electronic systems in the vehicle. Motor 322 may be connected to battery 344 via an inverter 342. Battery 344 can include, for example, one or more batteries, capacitive storage units, or other storage reservoirs suitable for storing electrical energy that can be used to power motor 322. When battery 344 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 350 (described below) may be included and may control the electric drive components of the vehicle as well as other vehicle components. For example, electronic control unit 350 may control inverter 342, adjust driving current supplied to motor 322, and adjust the current received from motor 322 during regenerative coasting and breaking. As a more particular example, output torque of the motor 322 can be increased or decreased by electronic control unit 350 through the inverter 342.

A torque converter 316 can be included to control the application of power from engine 314 and motor 322 to transmission 318. Torque converter 316 can include a viscous fluid coupling that transfers rotational power from the motive power source to the driveshaft via the transmission. Torque converter 316 can include a conventional torque converter or a lockup torque converter. In other embodiments, a mechanical clutch can be used in place of torque converter 316.

Clutch 315 can be included to engage and disengage engine 314 from the drivetrain of the vehicle. In the illustrated example, a crankshaft 332, which is an output member of engine 314, may be selectively coupled to the motor 322 and torque converter 316 via clutch 315. Clutch 315 can be implemented as, for example, a multiple disc type hydraulic frictional engagement device whose engagement is controlled by an actuator such as a hydraulic actuator. Clutch 315 may be controlled such that its engagement state is complete engagement, slip engagement, and complete disengagement complete disengagement, depending on the pressure applied to the clutch. For example, a torque capacity of clutch 315 may be controlled according to the hydraulic pressure supplied from a hydraulic control circuit (not illustrated). When clutch 315 is engaged, power transmission is provided in the power transmission path between the crankshaft 332 and torque converter 316. On the other hand, when clutch 315 is disengaged, motive power from engine 314 is not delivered to the torque converter 316. In a slip engagement state, clutch 315 is engaged, and motive power is provided to torque converter 316 according to a torque capacity (transmission torque) of the clutch 315.

As alluded to above, vehicle 300 may include an electronic control unit 350. Electronic control unit 350 may include circuitry to control various aspects of the vehicle operation. Electronic control unit 350 may include, for example, a microcomputer that includes a one or more processing units (e.g., microprocessors), memory storage (e.g., RAM, ROM, etc.), and I/O devices. The processing units of electronic control unit 350, execute instructions stored in memory to control one or more electrical systems or subsystems 358 in the vehicle. Electronic control unit 350 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 3, electronic control unit 350 receives information from a plurality of sensors included in vehicle 300. For example, electronic control unit 350 may receive signals that indicate vehicle operating conditions or characteristics, or signals that can be used to derive vehicle operating conditions or characteristics. These may include, but are not limited to accelerator operation amount ($A_{CC}$), a revolution speed ($N_E$), of internal combustion engine 314 (engine RPM), a rotational speed ($N_{MG}$) of the motor 322 (motor rotational speed), and vehicle speed ($N_V$). These may also include torque converter 316 output ($N_T$) (e.g., output amps indicative of motor output), brake operation amount/pressure (B), battery (SOC) (i.e., the charged amount for battery 344 detected by an SOC sensor). Accordingly, vehicle 300 can include a plurality of sensors 352 that can be used to detect various conditions internal or external to the vehicle and provide sensed conditions to engine control unit 350 (which, again, may be implemented as one or a plurality of individual control circuits). In one embodiment, sensors 352 may be included to detect one or more conditions directly or indirectly such as, for example, fuel efficiency ($E_F$), motor efficiency ($E_{MG}$), hybrid (internal combustion engine 314+MG 322) efficiency, acceleration ($A_{CC}$), etc.

In some embodiments, one or more of the sensors 352 may include their own processing capability to compute the results for additional information that can be provided to electronic control unit 350. In other embodiments, one or more sensors may be data-gathering-only sensors that provide only raw data to electronic control unit 350. In further embodiments, hybrid sensors may be included that provide a combination of raw data and processed data to electronic control unit 350. Sensors 352 may provide an analog output or a digital output.

Sensors 352 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 300, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 3 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 4:
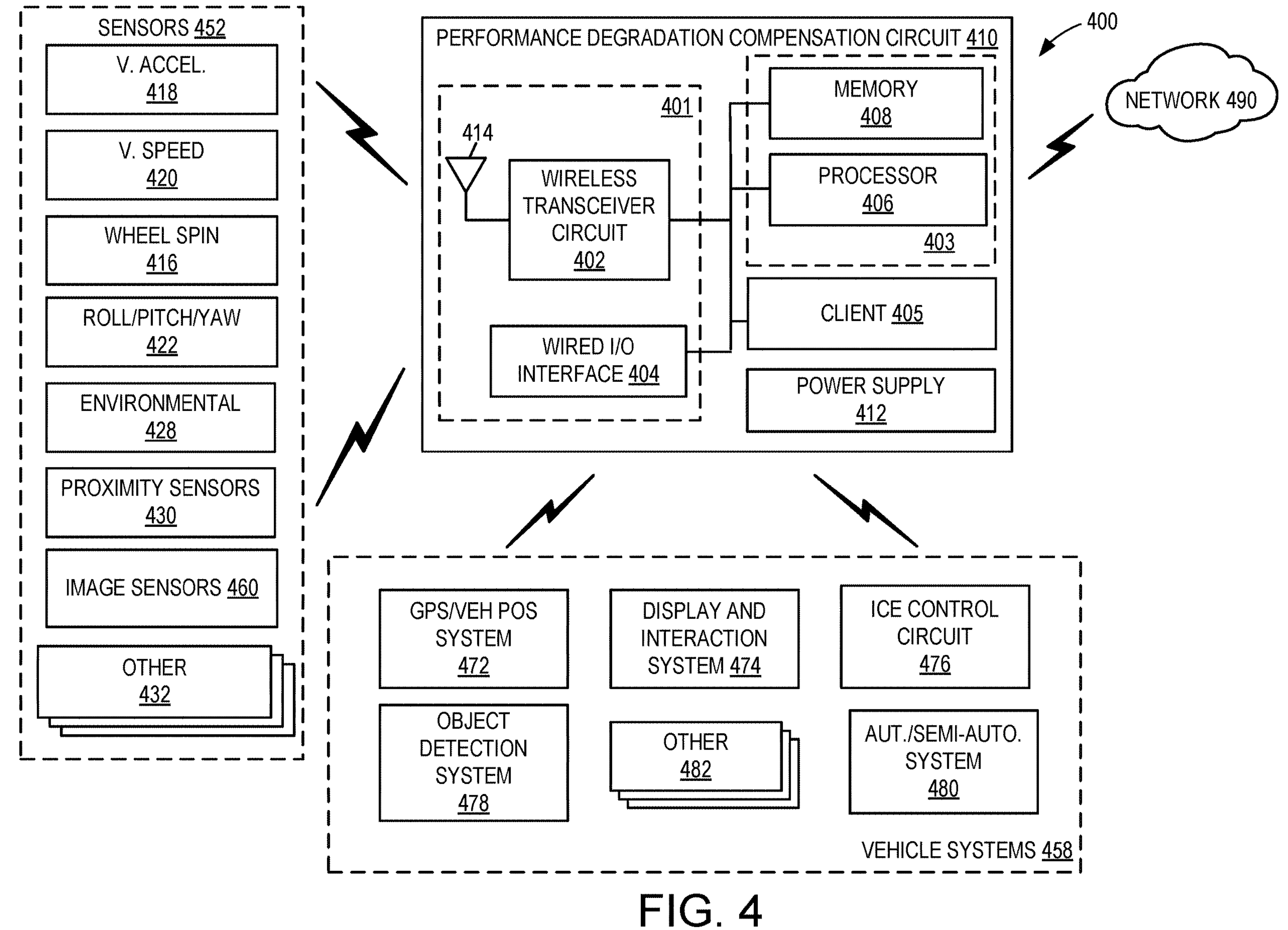
FIG. 4 illustrates an example architecture for performance compensation in vehicular knowledge networking in accordance with one embodiment of the systems and methods described herein.

FIG. 4 illustrates an example architecture for knowledge networking system 400 in accordance with one embodiment of the systems and methods described herein. Referring now to FIG. 4, in this example, knowledge networking system 400 includes a performance degradation compensation circuit 410, a plurality of sensors 452 and a plurality of vehicle systems 458. Sensors 452 (such as sensors 352 described in connection with FIG. 3) and vehicle systems 358 (such as subsystems 358 described in connection with FIG. 3) can communicate with performance degradation compensation circuit 410 via a wired or wireless communication interface. Although sensors 452 and vehicle systems 458 are depicted as communicating with hierarchical federated learning circuit 410, they can also communicate with each other as well as with other vehicle systems. Performance degradation compensation circuit 410 can be implemented as an ECU or as part of an ECU such as, for example electronic control unit 350. In other embodiments, performance degradation compensation circuit 410 can be implemented independently of the ECU.

Performance degradation compensation circuit 410 in this example includes a communication circuit 401, a decision circuit 403 (including a processor 406 and memory 408 in this example) and a power supply 412. Components of performance degradation compensation circuit 410 are illustrated as communicating with each other via a data bus, although other communication in interfaces can be included. Performance degradation compensation circuit 410 in this example also includes client 405 that can be operated to connect to an edge server of a network 490 to contribute to provide contextual factors, such as current conditions (e.g., representative of contextual factors); download knowledge (e.g., knowledge 145 of FIG. 1A) for use by vehicle systems 458; communicate results (e.g., performance results 148 of FIG. 1A), etc.

The decision circuit 403 can comprises a context engine, a knowledge cycle engine, and contrasting results engine. For example, the context engine may be executed by processor 406 for performing the context-based knowledge forwarding functions described above, including but not limited to: analyzing contextual features; constructing contextual feature maps; aggregating contextual features; contextual feature matching; determining a path for knowledge with specific contextual features. The knowledge cycle engine may be executed by processor 406 for performing knowledge cycle functions with contextual aspects, including but not limited to: executing stages of a knowledge cycle; inferring the contextual feature map of each step of knowledge cycle; and determine a path for knowledge with specific contextual features. The contrasting results engine may be executed by processor 406 for performing contrasting analysis functions with, including but not limited to: detecting contrasting results; identifying contrasting behavior that may have caused the contrasting result; and providing guidance to mitigate contrasting behaviors, thereby compensating for the contrasting result.

Processor 406 can include one or more GPUs, CPUs, microprocessors, or any other suitable processing system. Processor 406 may include a single core or multicore processors. The memory 408 may include one or more various forms of memory or data storage (e.g., flash, RAM, etc.) that may be used to store instructions and variables for processor 406 as well as any other suitable information, such as, one or more of the following elements: position data; vehicle speed data; risk and mitigation data, along with other data as needed. Memory 408 can be made up of one or more modules of one or more different types of memory, and may be configured to store data and other information as well as operational instructions that may be used by the processor 406 to performance degradation compensation circuit 410. For example, memory 408 may store instructions that, when executed by processor 406, perform functionality described in connection with FIGS. 1A and 1B above.

Although the example of FIG. 4 is illustrated using processor and memory circuitry, as described below with reference to circuits disclosed herein, decision circuit 403 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a performance degradation compensation circuit 410.

Communication circuit 401 includes either or both a wireless transceiver circuit 402 with an associated antenna 414 and a wired I/O interface 404 with an associated hardwired data port (not illustrated). Communication circuit 401 can provide for vehicle-to-everything (V2X) and/or vehicle-to-vehicle (V2V) communications capabilities, allowing performance degradation compensation circuit 410 to communicate with edge devices, network cloud servers and cloud-based databases, and/or other vehicles via network 490. For example, V2X communication capabilities allows performance degradation compensation circuit 410 to communicate with edge/cloud servers, roadside infrastructure (e.g., such as roadside equipment/roadside unit, which may be a vehicle-to-infrastructure (V2I)-enabled street light or cameras, for example), etc. Performance degradation compensation circuit 410 may also communicate with other connected vehicles over vehicle-to-vehicle (V2V) communications.

As this example illustrates, communications with performance degradation compensation circuit 410 can include either or both wired and wireless communications circuits 401. Wireless transceiver circuit 402 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by performance degradation compensation circuit 410 to/from other entities such as sensors 452 and vehicle systems 458.

Wired I/O interface 404 can include a transmitter and a receiver (not shown) for hardwired communications with other devices. For example, wired I/O interface 404 can provide a hardwired interface to other components, including sensors 452 and vehicle systems 458. Wired I/O interface 404 can communicate with other devices using Ethernet or any of a number of other wired communication protocols whether standardized, proprietary, open, point-to-point, networked or otherwise.

Power supply 412 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 452 can include, for example, sensors 352 such as those described above with reference to the example of FIG. 3. Sensors 452 can include additional sensors that may or may not otherwise be included on a standard vehicle with which the knowledge networking system 400 is implemented. In the illustrated example, sensors 452 include vehicle acceleration sensors 418, vehicle speed sensors 420, wheelspin sensors 416 (e.g., one for each wheel), accelerometers such as a 4-axis accelerometer 422 to detect roll, pitch and yaw of the vehicle, environmental sensors 428 (e.g., to detect salinity or other environmental conditions), and proximity sensor 430 (e.g., sonar, radar, lidar or other vehicle proximity sensors). Additional sensors 432 can also be included as may be appropriate for a given implementation of knowledge networking system 400.

System 400 may be equipped with one or more image sensors 460. These may include front facing image sensors, side facing image sensors, and/or rear facing image sensors. Image sensors may capture information which may be used in detecting not only vehicle conditions but also detecting conditions external to the vehicle as well. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 460 can be used to, for example, to detect objects in an environment surrounding a vehicle comprising knowledge networking system 400, for example, surrounding vehicles, roadway environment, road lanes, road curvature, obstacles, and so on. For example, a one or more image sensors 460 may capture images of surrounding vehicles in the surrounding environment. As another example, object detecting and recognition techniques may be used to detect objects and environmental conditions, such as, but not limited to, road conditions, surrounding vehicle behavior (e.g., driving behavior and the like), and the like. Additionally, sensors may estimate proximity between vehicles. For instance, the image sensors 460 may include cameras that may be used with and/or integrated with other proximity sensors 430 such as LIDAR sensors or any other sensors capable of capturing a distance. As used herein, a sensor set of a vehicle may refer to sensors 452.

Vehicle systems 458, for example, systems and subsystems 358 described above with reference to the example of FIG. 3, can include any of a number of different vehicle components or subsystems used to control or monitor various aspects of the vehicle and its performance. In this example, the vehicle systems 458 includes a vehicle positioning system 472; engine control circuits 476 to control the operation of engine (e.g. internal combustion engine 314 and/or motors 322); object detection system 478 to perform image processing such as object recognition and detection on images from image sensors 460, proximity estimation, for example, from image sensors 460 and/or proximity sensors, etc. for use in other vehicle systems; vehicle display and interaction system 474 (e.g., vehicle audio system for broadcasting notifications over one or more vehicle speakers), vehicle display system and/or the vehicle dashboard system), and other vehicle systems 482 (e.g., Advanced Driver-Assistance Systems (ADAS), autonomous or semi-autonomous driving systems 480, such as forward/rear collision detection and warning systems, pedestrian detection systems, autonomous or semi-autonomous driving systems, and the like).

Autonomous or semi-autonomous driving systems 480 can be operatively connected to the various vehicle systems 458 and/or individual components thereof. For example, autonomous or semi-autonomous driving systems 480 can send and/or receive information from the various vehicle systems 458 to control the movement, speed, maneuvering, heading, direction, etc. of the vehicle. The autonomous or semi-autonomous driving systems 480 may control some or all of these vehicle systems 458 and, thus, may be semi- or fully autonomous. In some examples, guidance, either knowledge-based guidance and/or compensation guidance, can be provided to autonomous or semi-autonomous driving systems 480 and used to control vehicle systems 458 and/or individual components thereof.

Network 490 may be a conventional type of network, wired or wireless, and may have numerous different configurations including a star configuration, token ring configuration, or other configurations. Furthermore, the network 490 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 490 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 490 may include one or more IEEE 802.11 wireless networks.

In some embodiments, the network 490 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VOLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 5G-V2X message; and a millimeter wave message, etc.

During operation, performance degradation compensation circuit 410 can receive information from various vehicle sensors to determine conditions of a driving environment, which can be used to construct contextual features, as described above in connection with FIGS. 1A-2. Communication circuit 401 can be used to transmit and receive information between performance degradation compensation circuit 410 and sensors 452, and performance degradation compensation circuit 410 and vehicle systems 458. Also, sensors 452 may communicate with vehicle systems 458 directly or indirectly (e.g., via communication circuit 401 or otherwise).

In various embodiments, communication circuit 401 can be configured to receive data and other information from edge or cloud serves vis client 405, which can be communicated to vehicle systems 458 for performing vehicle operations. For example, knowledge can be received from an edge server via communication circuit 401 and provided to machine learning model, stored in memory, to execute a guidance application via one or more subsystems 458. For example, autonomous or semi-autonomous driving systems 480 may comprise a machine learning model that controls vehicle operations according to knowledge received.

Figure 5:
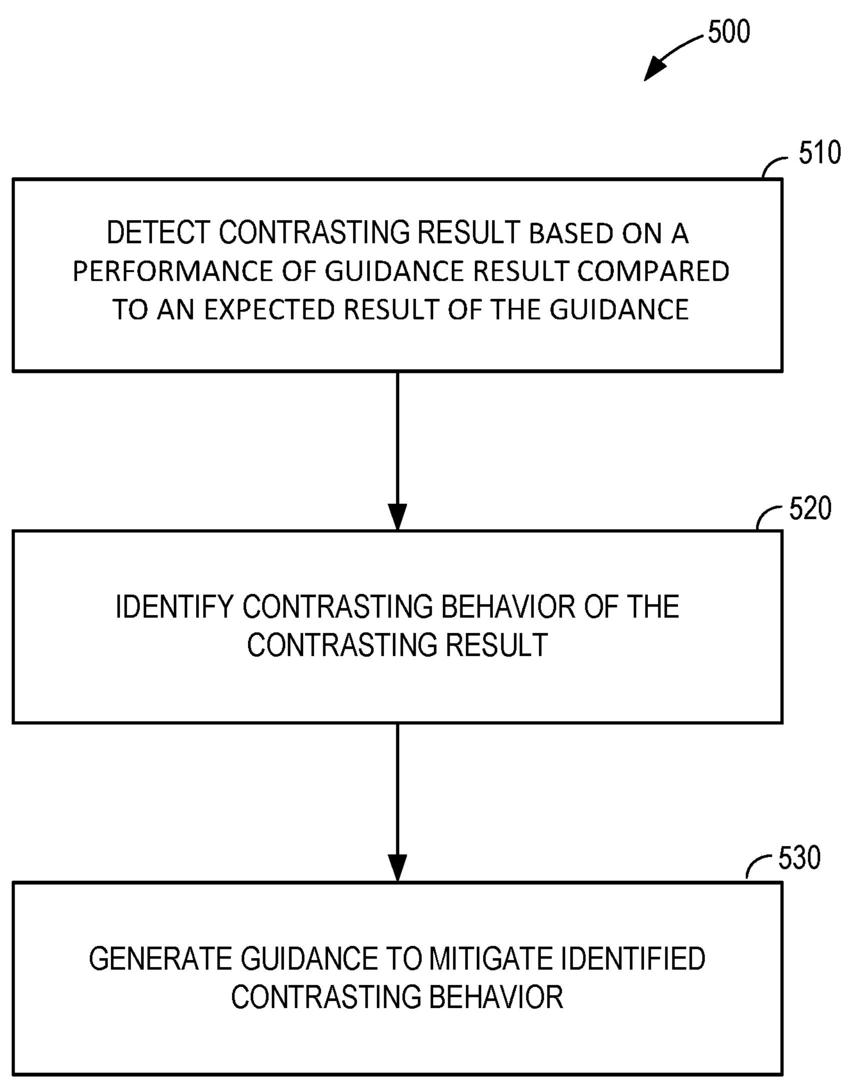
FIG. 5 is a flow chart illustrating example operations for compensation of performance degradation in vehicular knowledge networking in accordance with embodiments disclosed herein.

FIG. 5 is a flow chart illustrating example operations for compensation of performance degradation in vehicular knowledge networking in accordance with embodiments disclosed herein. Process 500 may be implemented as instructions, for example, stored on in memory, that when executed by one or more processors perform one or more operations of process 500. In one example, process 500 may be implemented as instructions stored on performance degradation compensation circuit 410, that when executed by one or more processors, perform one or more operations of process 500. In another example, one or more operations of process 500 may be performed by an edge server, such as computer system 140 of FIG. 1. Furthermore, one or more operations of process 500 can be executed by performance degradation compensation circuit 410, while other operations are performed by computer system 140.

At operation 510, a contrasting result can be detected based on a performance result of guidance compared to an expected result of the guidance. The performance of the guidance may be performance results after a vehicle has executed the guidance in a first driving environment. The guidance may be associated with a second driving environment that is substantially the same or identical to (e.g., corresponds to) the first driving environment. In some examples, the guidance may be knowledge-based guidance that is based on knowledge associated with a second driving environment that is substantially the same or identical to the first driving environment, as described above in connection with FIG. 1A.

For example, a vehicle may collect vehicle data using sensors (e.g., sensors 452) and/or vehicle subsystems (e.g., vehicle systems 458) to obtain current conditions of a first driving environment while the vehicle travels in the first driving environment. The current conditions can be provided as a first set of contextual features of the first driving environment. The collected data may be from the vehicle itself and/or other connected vehicles (e.g., vehicular micro cloud or other peer-to-peer network). In some examples, an edge server may also communicate current contextual features to a vehicle. Contextual features can be static features, such as, but not limited to, a location, road geometry, traffic rules, and the like. Contextual features can be dynamic features, such as, but not limited to, traffic flow, vehicle/driver type, congestion, type of objects at the location, risk caused by other drivers, etc.

The current contextual features can be used to retrieve knowledge from an edge server, which can be utilized by a guidance model provide guidance to a vehicle subsystem for controlling vehicular operations. For example, the vehicle can compose a query, including the first set of contextual features, which can be provided to an edge server. The edge server can access a database of knowledge according to the first set of contextual features, locate the second set of contextual features (e.g., context 146 of FIG. 1A) that is substantially the same or identical to the first set of contextual features (e.g., at least a threshold amount of overlap of contextual features, as described above in connection with FIG. 1A), and retrieve knowledge (e.g., knowledge 145 of FIG. 1A) associated with the second set of contextual features. The knowledge can be provided to a computer (e.g., performance degradation compensation circuit 410), which executes guidance according to the knowledge (e.g., performs some vehicle operation based on the knowledge).

The performance of the guidance can be measured to provide a performance result and used to determine whether or not the performance differs from an expected result associated with the knowledge. For example, the performance can be measured using sensors 452 and/or vehicle systems 458 and then stored as a performance result. This result can be compared, at the vehicle or at an edge server, to the expected result of the knowledge-based guidance. If the result differs, for example, by being outside a defined deviation of the expected result, the performance result can be tagged or otherwise labeled as a contrasting result.

At operation 520, contrasting behavior of the first vehicle that may have caused the contrasting result is identified, for example, based on a comparison between the first and second driving environments. For example, the first driving environment can be compared to the second driving environment to infer factors experience by the vehicle that may have caused the contrasting result. More particularly, for example, operation 520 may include identifying differences between contextual features of the first set of contextual features relative to the second set of contextual features associated with the expected result. For example, contextual features that are present in one set and absent from the other can be identified as contrasting factors. In various examples, the contrasting factors may comprise dynamic factors, as described above.

At operation 530, guidance can be generated configured to mitigate the inferred contrasting behavior, which can compensate for the contrasting results. For example, operation 530 may include generating a second guidance (also referred to as a compensation guidance) that strives to mitigate the contrasting behavior recognized in a set of contextual features obtained from another vehicle. The second guidance can be generated so as to reduce the likelihood that the other vehicle performs the contrasting behavior and/or coordinates surrounding vehicles to reduce such likelihood.

In an example use case, process 500 can be used to compensate for performance degradation in driving range estimation, for example, in BEVs or HEVs, as described above in connection with FIGS. 1A and 1B. For example, vehicle 110 may execute operation 510 to infer contextual features at a point P1 (e.g., highway with medium traffic congestion and vehicle 110 is a passenger car traveling at 65 mph) and retrieve, from computer system 140, knowledge 145 according to context 146 that may be substantially the same or identical to the inferred contextual features. Vehicle 110 may execute guidance according to knowledge 145, and compute current results of the guidance. The current performance results, for example, estimate of available driving range on electrical power, can be compared to excepted results to detect contrasting results. Upon detecting contrasting results, in one example of operation 520, vehicle 110 may compare the inferred contextual features to the context 146 and identify contrasting factors. In another case, performance results 148 and context 147 can be provided to 140, which performs operation 520. In either case, contrasting factors may be determined as aggressive driving behavior due to path 108 (e.g., intermittent speeding and weaving between lanes), which corresponds to the contrasting result. Using the inferred contrasting factors, at operation 530, guidance can be generated in the form of speed and lane change advisories to one or more vehicles to coordinate vehicles into a platoon designed to avoid speeding and weaving by vehicles. This coordination may be communicated from computer system 140 or from one or more vehicles in the environment.

In another use case, process 500 can be used to compensate for performance degradation in contrasting arrival times according to a mapped guidance, for example, by a navigation system. For example, a vehicle 110 may execute operation 510 to infer (e.g., urban area with medium traffic congestion and ego vehicle is a passenger car traveling at 45 mph) and retrieve, from an edge server, knowledge according to a context that may be the same or similar to the inferred contextual features. The guidance may be provided as a navigation path displayed on a map presented on interaction system 474. Upon arriving at the destination, the performance of the navigation can computed current, for example, as an amount of time between departure and arrival. The time to arrival can be compared to excepted results arrival time to detect a contrasting results. Upon detecting contrasting results, at operation 520, the inferred contextual features can be compared to the context used to retrieve the knowledge and identify contrasting factors. In an example, contrasting factors may be that the vehicle performed multiple turn loops, for example, due to confusion at intersections, which lead to the contrasting results. Using the inferred contrasting factors, at operation 530, guidance can be generated in the form of increased amount of micro-level and increased detailed map guidance to mitigate confusion and decrease arrival time.

Figure 6:
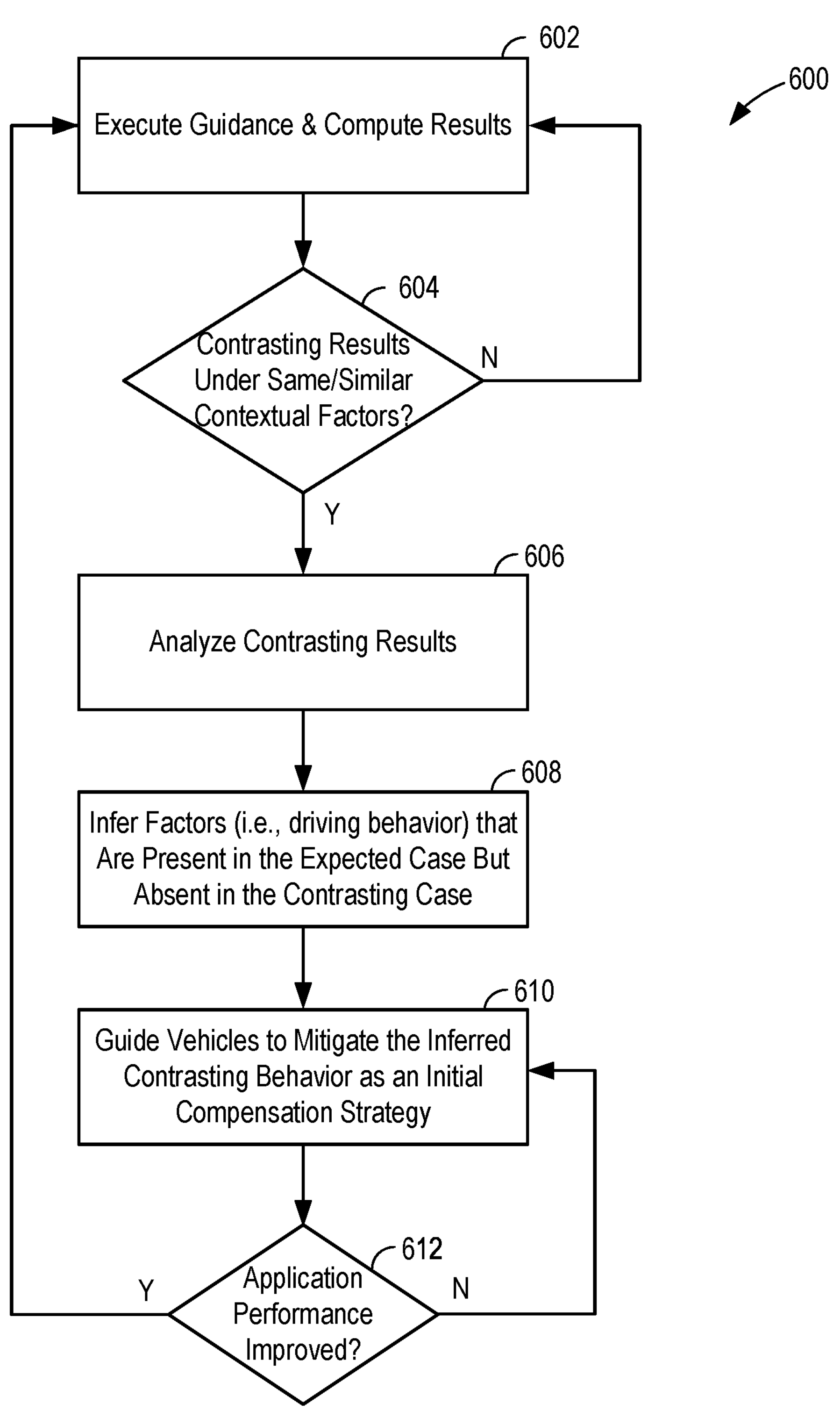
FIG. 6 is flow chart illustrating an example process for performance degradation compensation in vehicular knowledge networking in accordance with embodiments disclosed herein.

FIG. 6 is flow chart illustrating an example process for performance degradation compensation in vehicular knowledge networking in accordance with embodiments disclosed herein. Process 600 may be implemented as instructions, for example, stored on in memory, that when executed by one or more processors perform one or more operations of process 600. In one example, process 600 may be implemented as instructions stored on performance degradation compensation circuit 410, that when executed by one or more processors to perform one or more operations of process 500. In another example, one or more operations of process 600 may be performed by an edge server, such as computer system 140 of FIG. 1. Furthermore, one or more operations of process 600 can be executed by performance degradation compensation circuit 410, while other operations are performed by computer system 140.

At block 602, guidance is executed by a vehicle and performance results can be computed, for example, based on vehicle data collected by sensors and/or vehicles subsystems (e.g., sensors 452 and/or vehicle systems 458). For example, as described above in connection with FIGS. 1A and 5, knowledge-based guidance can be obtained based on current conditions (e.g., current set of contextual features) inferred from vehicle data collected by the vehicle.

At determination block 604, a determination is made as to whether the performance results computed at block 602 is a contrasting results. For example, as described in connection with FIGS. 1A and 5, the performance result is compared to an expected result of the knowledge-based guidance, where the knowledge-based guidance is associated with a set of contextual features that is substantially similar or identical to the current conditions. Determination block 604 determines whether the performance results differ from the expected results, representative of a performance degradation in the guidance model that provided the knowledge-based guidance. If the performance results do not differ (e.g., no at determination block 604), process 600 returns to block 602 for a next execution of the knowledge-based guidance, either by the same or a different vehicle.

However, if the performance result does differ, for example, are outside a defined deviation from the expected results (e.g., yes at determination block 604), process 600 proceeds to block 606 where the contrasting result is analyzed. In examples, block 604 examines at the objective function. For example, block 604 checks if there are contrasting results in the performance results for similar driving environments, e.g., in environment performance was as expected, but in another performance differs from expectations. Block 608, described below in more details, can be more general and looks for the origin of the contrasting results (e.g., the contextual factors that drive the contrasting results).

At block 608, contextual factors (e.g., driving behaviors) that may have caused the contrasting result are inferred. For example, differences between contextual features of the current conditions relative to the set of contextual features associated with the expected result can be inferred. In other words, contextual features that are present in the current conditions, but absent from the set of contextual features associated with the expected result can be inferred as a factor. Similarly, contextual features that are absent from the current conditions, but present in the set of contextual features associated with the expected result can be inferred as a factor.

At block 610, subsequent vehicles can be guided according to compensation guidance to mitigate the inferred contextual factors. Subsequent vehicles may refer to vehicles that experience the current conditions from block 610 or substantially similar conditions to the current conditions from block 610 at time executing block 608. The compensation guidance can be configured to mitigate the inferred factor (e.g., driving behavior), which can compensate for the contrasting results. For example, block 610 may include generating guidance to reduce the likelihood that the other vehicle performs the contrasting behavior and/or coordinates surrounding vehicles to reduce such likelihood.

At determination block 612, a determination is made as to whether or not the performance of the guidance has improved. For example, the performance of guidance at block 610 can be computed in a manner similar to that described for block 602. A difference between the expected result and the performance result of block 612 can be computed, which can be compared to a prior difference in performance result (e.g., the performance computed in block 602) to expected result. If the difference at determination block 612 is less than the prior difference, then the performance may be considered as improving and process 600 returns to block 602. Whereas, if the performance does not improve, process 600 returns to block 610 as feedback that adjusts the compensation guidance to further improve performance.

While examples provided herein, for example, such as described in connection with FIGS. 5 and 6, are described as detecting contrasting results from knowledge-based guidance, the scope of the embodiments is not intended to be limited to knowledge-based guidance only. Embodiments disclosed herein may be able to detect contrasting results from any guidance or model, not only knowledge-based guidance.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up vehicular knowledge network system 100 of FIGS. 1A and 1B and/or vehicle 300 of FIG. 3. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 may store instructions that, when executed by processor 704, execute one or more operations of process 500 of FIG. 5 and/or process 600 of FIG. 6. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

detecting a performance result of first guidance performed by a first vehicle in a first driving environment that differs from an expected result associated with the first guidance associated with a second driving environment that corresponds to the first driving environment;

identifying negative driving behavior executed by the first vehicle associated with the detected performance result based on a comparison between the first driving environment to the second driving environment; and in response to detecting that a second vehicle is also executing the identified negative driving behavior, and in response to determining that the negative driving behavior contrasts with driving behavior performed by one or more connected vehicles, generate second guidance to the second vehicle, the second guidance being generated to reduce or eliminate the negative driving behavior being executed by the second vehicle.

2. The method of claim 1, further comprising:

determining that the second driving environment corresponds to the first driving environment based on a first set of contextual features associated with the first driving environment comprising a threshold amount of contextual features comprised in a second set of contextual features associated with the second driving environment.

3. The method of claim 2, wherein the first set of contextual features comprises at least one of static features and dynamic features obtained from the first driving environment.

4. The method of claim 1, wherein detecting a performance result comprises:

after the first vehicle performs the first guidance, receiving information representative of the performance result of the first guidance; and comparing the performance result to the expected result.

5. The method of claim 1, wherein identifying the behavior comprises:

inferring a contrasting contextual feature based on comparing a first set of contextual features associated with the first driving environment to a second set of contextual features of a second set of contextual factors associated with the second driving environment.

6. The method of claim 5, wherein the contrasting contextual feature is a contextual feature that differs between the first set of contextual features and the second set of contextual features.

7. The method of claim 5, inferring a contextual feature difference comprises:

identifying one or more contextual features included in the first set of contextual features that are absent from the second set of contextual features.

8. The method of claim 5, inferring a contextual feature difference comprises:

identifying one or more contextual features included in the second set of contextual features that are absent from the first set of contextual features.

9. The method of claim 5, wherein the contrasting contextual feature comprises a dynamic feature.

10. The method of claim 5, wherein mitigating the identified behavior being executed by the second vehicle comprises mitigating the inferred contrasting contextual feature.

11. The method of claim 1, wherein the second guidance comprises coordination between a plurality of vehicles within a third driving environment in which the second vehicle is traveling, wherein the coordination is configured to mitigate the identified contrasting behavior of the second vehicle.

12. An apparatus of a vehicular knowledge network, the apparatus comprising:

a memory storing instructions; and one or more processors communicably coupled to the memory and configured to execute the instructions to:

obtain a performance result of first guidance performed by a first vehicle in a first driving environment, wherein the first guidance is associated with a second driving environment that corresponds to the first driving environment;

determine that the performance result differs from an expected result associated with the first driving environment;

based on the determination, infer negative driving behavior of the first vehicle based on a comparison between the first driving environment to the second driving environment; and in response to detecting that a second vehicle is also executing the inferred negative driving behavior, and in response to determining that the negative driving behavior contrasts with driving behavior performed by one or more connected vehicles, generate second guidance configured to the second vehicle, the second guidance being generated to reduce or eliminate the negative driving behavior being executed by the second vehicle.

13. The apparatus of claim 12, wherein the apparatus is one of a vehicle and a server.

14. The apparatus of claim 12, wherein inferring the behavior of the first vehicle comprises:

inferring a contrasting contextual feature based on comparing a first set of contextual features associated with the first driving environment to a second set of contextual features of a second set of contextual factors associated with the second driving environment.

15. The apparatus of claim 14, wherein the contrasting contextual feature is a contextual feature that differs between the first set of contextual features and the second set of contextual features.

16. The apparatus of claim 14, wherein the contrasting contextual feature comprises a dynamic feature.

17. A system comprising:

a memory storing instructions; and one or more processors configured to execute the instructions to:

identify negative driving behavior of a first vehicle in a first driving environment that deviates from expected driving behavior based on the first vehicle executing first guidance; and obtain a performance result of first guidance performed by a first vehicle in a first driving environment, wherein the first guidance is associated with a second driving environment that corresponds to the first driving environment;

determine that the performance result differs from an expected result associated with the first driving environment;

based on the determination, infer negative driving behavior of the first vehicle based on a comparison between the first driving environment to the second driving environment; and in response to detecting that a second vehicle is also executing the inferred negative driving behavior, and in response to determining that the negative driving behavior contrasts with driving behavior performed by one or more connected vehicles, generate second guidance configured to the second vehicle, the second guidance being generated to reduce or eliminate the negative driving behavior being executed by the second vehicle.

18. The system of claim 17, wherein the first guidance is knowledge-based guidance obtained based on a determination that a first set of contextual features associated with the first driving environment correspond to a second set of contextual features associated with the knowledge-based guidance.

19. The system of claim 18, wherein identifying the negative driving behavior comprises determining a contextual feature that differs between the first set of contextual features and the second set of contextual features.

20. The system of claim 17, wherein the compensation guidance comprises coordination between a plurality of vehicles within a second driving environment in which the second vehicle is traveling, wherein the coordination is configured to mitigate the identified negative driving behavior of the second vehicle.

* * * * *